(12) United States Patent
Inase et al.

(10) Patent No.: US 6,804,189 B2
(45) Date of Patent: Oct. 12, 2004

(54) NEAR FIELD OPTICAL RECORDING MEDIUM

(75) Inventors: Toshio Inase, Ebina (JP); Koyata Takahashi, Sagamihara (JP); Koji Katayama, Yamato (JP); Tatsuo Kawasaki, Kanagawa-ken (JP); Kenichi Sekimoto, Sagamihara (JP); Toru Futami, Yokohama (JP); Keiichiro Nishizawa, Yokohama (JP)

(73) Assignee: Tosoh Corporation, Yamaguchi-ken (JP)

( * ) Notice: Subject to any disclaimer, the term of this patent is extended or adjusted under 35 U.S.C. 154(b) by 587 days.

(21) Appl. No.: 09/826,853

(22) Filed: Apr. 6, 2001

(65) Prior Publication Data

US 2002/0054561 A1 May 9, 2002

(30) Foreign Application Priority Data

| Apr. 7, 2000 | (JP) | 2000-111898 |
| Apr. 10, 2000 | (JP) | 2000-113239 |
| Apr. 11, 2000 | (JP) | 2000-115801 |
| Jul. 7, 2000 | (JP) | 2000-211994 |

(51) Int. Cl.$^7$ .................................................. G11B 7/00
(52) U.S. Cl. .................................................... 369/275.3
(58) Field of Search ........................... 369/126, 275.3, 369/275.2, 112.23

(56) References Cited

U.S. PATENT DOCUMENTS 5,734,632 A * 3/1998 Ito et al. .................. 369/44.23

OTHER PUBLICATIONS

B.D. Terris et al., "Near–field optical data storage", Appl. Phys. Lett. 68 (2), Jan. 8, 1996, pp. 141–143.

* cited by examiner

Primary Examiner—Nabil Hindi
(74) Attorney, Agent, or Firm—Sughrue Mion, PLLC

(57) ABSTRACT

A near field optical recording medium having a header area in which at least an addressing signal or a timing signal is recorded by means of a concave/convex pattern with laser light using a flying optical head. When a concave/convex portion of the concave/convex pattern is to be detected, either an effect due to a change in returning light caused by distance wherein the reflectance is changed or an effect due to a change in returning light caused by a diffraction effect is sufficiently larger, or a combination of such effects (changes by distance effect and changes by diffraction effect) are not weakened by each other, so that header information recorded by the concave/convex pattern can correctly be reproduced even in a super-high density recording medium using near field light.

25 Claims, 20 Drawing Sheets

A

B

NEAR FIELD OPTICAL RECORDING MEDIUM

BACKGROUND OF THE INVENTION

1. Field of the Invention

The present invention relates to a surface-readout type near field optical recording medium wherein recording and/or reproducing is conducted by bringing an optical head close to the recording medium surface, and in particular, a surface-readout type near field magneto-optical recording medium wherein information-recording/reproducing/erasing are conducted by utilizing laser light and a magnetic field, or a surface-readout type near field phase-change recording medium wherein information-recording/reproducing/erasing are conducted by only laser light.

2. Discussion of Background

An optical recording medium is a portable recording medium permitting large quantity and high density recording, for which there has been an increase of demand as a rewritable medium for a large volume file of computer or for recording dynamic images in current fashion of multimedia.

The optical recording medium generally comprises a transparent circular disc-like substrate made of a plastic material or the like on which a multilayer including a recording layer is formed. Recording or erasing is carried out by irradiating laser light, and reproducing is carried out by reflection light of the laser light. The optical recording medium is classified into an erasable type capable of rewriting such as a magneto-optical recording medium or a phase-change recording medium and a write-once type capable of writing only once such as CD-R. In the magneto-optical recording medium, a so-called light modulation recording has mainly been used wherein information is erased by applying a fixed magnetic field, and then, recording is carried out by applying a fixed magnetic field in an opposite direction. However, in recent years, there has been noted a magnetic field modulation system wherein a magnetic field is modulated according to a recording pattern while laser light is irradiated because such system can record correctly information in one revolution (direct over-write) at a high recording density. Demands for the phase-change recording medium have recently been increasing because it is possible to conduct the direct over-writing by an optical modulation recording system and to conduct reproducing by the using the same optical system as for CD or DVD. Further, a write-once type CD-R is widely spread because it is completely compatible with CD.

In the optical recording medium, a track or tracks are generally formed substantially concentrically or spirally, and each track is divided into several ten sectors to several hundred sectors. Each sector has a data area in which a user records his or her own data and a header area in which information for reproducing the address and so on of each sector (hereinbelow, referred to as a header information) is previously recorded. The data area has guide grooves or guide marks according to which laser light follows an intended track. Generally, the follow-up of laser light to the track is carried out by detecting a change in the intensity of reflection light of diffraction light from these guide grooves or guide marks. The header information is previously formed by preparing a concave/convex pattern in a master plate by controlling ON/OFF in the irradiation of laser light in a mastering step, the pattern being transferred to the substrate in a molding step (hereinbelow, referred to as a hard format); is formed by recording only a timing signal in the substrate, which provides datum :for recording addresses and so on, the addresses and so on being written later by the same method as the recording of data (hereinbelow, referred to as a soft format), or is formed by using these methods in combination. In any case, information recorded in the header area Ls called generically as a header information, and concave portions in the concave/convex pattern constituting the header information are called pits and convex portions are called bumps. Further, the concave/convex portion or the header information which is previously formed in the substrate is called a pre-pit portion.

Conventionally, laser for recording or reproducing is irradiated to the recording layer through the substrate. As a technique of bringing an optical head close to the recording layer to conduct recording or reproducing, a so-called near field optical recording has been noted as means for increasing recording density (Appl. Phys. Lett. 68, p. 141 (1996). In this recording method, an optical head (hereinbelow, referred to as SIL head) having a solid immersion lens (hereinbelow, referred to as SIL) is used to reduce the spot size of laser light, whereby it is possible to reproduce smaller marks which is beyond the limit of the conventional recording technique determined by a laser wavelength ($\lambda$) of a light source (~$\lambda$/2NA: NA represents a numerical aperture of objective lens), and recording or reproducing can be realized at a superhigh recording density. In the near field optical recording, it is necessary to bring the optical head closer to the recording medium (~100 nm or less). Accordingly, unlike the conventional optical recording medium to which laser light is irradiated to the recording layer through the substrate, a method for irradiating directly laser light to the recording layer without passing through the substrate, is used (surface-readout type recording). In this case, use of a flying type optical head having a slider is proposed in order to bring SIL head closer to the recording layer. Further, in the structure of the recording layer, the conventional optical recording medium is generally of substrate/first protective layer/recording layer/second protective layer/reflection layer. On the other hand, in the near field optical recording, there is a contrary film structure such as, for example, substrate/reflection layer/first protective layer/recording layer/second protective layer so that recording and reproducing are conducted by irradiating laser beams from the layer surface side.

In the conventional optical recording medium, the header information is recorded with the position or the length of pits having a width in a direction perpendicular to a track (which is narrower than the width of the track as in CD), and the reproducing is carried out by detecting a change in the intensity of returning light from pits due to a reflection effect when laser light is irradiated. In the case of the above-mentioned surface-readout near field optical recording, however, it was very difficult to reproduce correctly the header information by detecting the position and the length of pits having a width in a direction perpendicular to a track, which was narrower than the width of the track.

SUMMARY OF THE INVENTION

The near field optical recording medium of the present invention is constructed so that a header area in which at least an addressing signal for reproducing an address or a timing signal for providing datum for writing an address is recorded in a substrate by means of a concave/convex pattern is provided, and recording and/or reproducing is conducted by laser light using a flying optical head, wherein when a concave/convex portion which constitutes the concave/convex pattern is detected, either one of an effect caused by a distance effect wherein the reflectance is changed depending on the distance between a bottom surface of the optical head and the substrate surface and an effect caused by a diffraction effect at a step is sufficiently larger than the other, or the effect caused by the distance effect and the effect caused by the diffraction effect are not weakened each other, whereby a header information can correctly be reproduced. Further, the near field optical recording medium is constructed so that the effect by the distance effect and the effect by the diffraction effect are mutually strengthened, whereby the header information can correctly be reproduced more easily.

Namely, the present invention concerns a near field optical recording medium having a header area in which at least an addressing signal for reproducing an address or a timing signal for providing datum for writing an address is recorded by means of a concave/convex pattern formed in a substrate wherein recording and/or reproducing is conducted by laser light using a flying optical head, the near field optical recording medium being characterized in that said concave/convex pattern is constituted by concave pits or convex bumps, each width of the pits or the bumps in a direction perpendicular to a track being smaller than the beam spot, wherein $|Dp-Df|/(Dp+Df) \geq 0.05$ where Dp is an intensity of returning light returned to the optical head at a position just above a pit or just above a bump and Df is an intensity of returning light returned to the optical head in a flat portion in which no pit or bump is formed, or said concave/convex pattern is constituted by concave portions and convex portions adjacent to each other wherein in a case that returning light returned to the optical head at a position just above a step portion, which is formed at the boundary of a concave portion and a convex portion which are adjacent to each other in a direction of track, is divided into a concave side and a convex side, $|Dc-Dd|/(Dc+Dd) \geq 0.05$ where Dc is an intensity of returning light at a concave side and Dd is an intensity of returning light at a convex side.

The near field optical recording medium of the present invention comprises a header area in which at least an addressing signal for reproducing an address or a timing signal for providing datum for writing an address is recorded by means of a concave/convex pattern formed in a substrate wherein recording and/or reproducing is conducted by laser light using a flying optical head, the near field optical recording medium being characterized in that a change in returning light returned from the concave/convex portion formed in the header area includes at least a change due to a distance effect wherein the reflectance is changed depending on the distance between a bottom surface of the optical head and the substrate surface and a change due to a diffraction effect caused by a step, and wherein the header area is so constructed that in detecting the concave/convex portion, the effect due to the change by the distance effect and the effect by the diffraction effect are not mutually weakened each other. Further, the near field optical recording medium is constructed so that the effect due to the change by the distance effect and the effect by the diffraction effect are mutually strengthened.

The near field optical recording medium of the present invention is constructed so that the concave/convex pattern is constituted by concave pits, each width of the pits in a direction perpendicular to a track being smaller than the beam spot, wherein when Ht is the distance between a bottom surface of the optical head and a flat portion in which no pit is formed, and Ha is the distance between the bottom surface of the optical head and a bottom surface of a pit, the reflectance R has a negative inclination in a range of from Ht to Ha.

Further, the near field optical recording medium of the present invention is constructed so that the concave/convex pattern is constituted by convex bumps, each width of the bumps in a direction perpendicular to a track being smaller than the beam spot, wherein when Ht is the distance between a bottom surface of the optical head and a flat portion in which no bump is formed, and Hb is the distance between the bottom surface of the optical head and an upper surface of a bump, the reflectance R has a positive inclination in a range of from Hb to Ht.

Further, the near field optical recording medium of the present invention is constructed so that the concave/convex pattern is constituted by concave portions and convex portions which are adjacent to each other, wherein when Hc is the distance between a bottom surface of the optical head and a bottom surface of a concave portion, and Hd is the distance between the bottom surface of the optical head and an upper surface of a convex portion, the reflectance R has a positive inclination in a range of from Hc to Hd. In this case, when concave portions or convex portions in the concave/convex pattern formed in the header area are at an equivalent position in adjacent tracks, it is preferable that the concave portions or the convex portions are connected in a direction perpendicular to the tracks by bridging the adjacent tracks. Further, when concave portions or convex portions are not at an equivalent position in adjacent tracks, it is preferable that a step formed at the boundary of a concave portion and a convex portion, which are adjacent to each other in adjacent tracks, is shifted to a side of the track in which the convex portion is formed, with respect to the boundary of the adjacent tracks.

BRIEF DESCRIPTION OF THE DRAWINGS

In FIG. 1, a direction of left and right corresponds to a direction of track, and a recording medium 15 is moved from right to left. Laser light 11 is irradiated through SIL 12 provided on the optical head, and near field light 13 is incident into the recording medium 15. Numeral 14 indicates reflection light from the recording medium 15.

In FIG. 2, a direction of left and right corresponds to a direction perpendicular to a track, and a recording medium 25 is moved from a front side of the paper surface to a rear side. Laser light 21 is irradiated through SIL provided on the optical head, and near field light 23 is incident into the recording medium 25. Numerals 26, 27 indicate light diffracted by a step provided by a side surface of pit.

FIG. 3(a) is a plan view showing diagrammatically shapes of concave and convex in 3 tracks. A direction of left and right corresponds to a direction of track. When a circular disc-like recording medium is used, a vertical direction indicates a radial direction. Black-colored portions (for instance, 31) indicate pits constituting the concave/convex pattern, and the other portion (for instance, 32) indicates a flat portion in which no pit is formed. The recording medium is moved from right to left, and laser light 33 irradiated through an optical head is moved relatively from A toward C. Numeral 34 designates a track pitch (a track width) and numeral 35 designates the boundary of tracks. FIG. 3(b) is a diagram showing a change in the light intensity of returning light due to a distance effect, and FIG. 3(c) is a diagram showing a change in the light intensity of returning light due to a diffraction effect caused by a step (for instance, 38) provided by a side surface of a pit in parallel to the track. FIG. 3(d) is a diagram showing a change in the light intensity of returning light in combination of the distance effect and the diffraction effect.

In FIG. 4, a direction of left and right corresponds to a direction of track, and the recording medium is moved from right to left. Laser light 41 is irradiated through SIL 42 provided on the optical head, and near field light 43 is incident into the recording medium. Numeral 44 indicates reflection light from the recording medium, and numeral 45 indicates diffraction light due to a step formed at the boundary of the concave portion and the convex portion.

FIG. 5(a) is a plan view showing diagrammatically shapes of concave and convex in 3 tracks. A direction of left and right corresponds to a direction of track. When a circular disc-like recording medium is used, a vertical direction indicates a radial direction. Black-colored portions (for instance, 51) indicate pits constituting the concave/convex pattern, and the other portion (for instance 52) indicates a flat portion in which no pit is formed. The recording medium is moved from right to left, and laser light 53 irradiated through the optical head is moved relatively from A toward C. Numeral 54 designates a track pitch (a track width) and numeral 55 designates the boundary of tracks. FIG. 5(b) is a diagram showing a change in the light intensity of returning light due to a distance effect, and FIG. 5(c) is a diagram showing a change in the light intensity of returning light due to a diffraction effect caused by a step (for instance, 58) formed at a side surface of a pitch in parallel to the track. FIG. 5(d) is a diagram showing a change in the light intensity of returning light in combination of the distance effect and the diffraction effect.

FIG. 6(a) is a plan view showing diagrammatically shapes of concave and convex in 3 tracks. A direction of left and right corresponds to a direction of track. When a circular disc-like recording medium is used, a vertical direction indicates a radial direction. A black-colored portion (for instance, 61) indicates a flat portion in which no bump is formed, and blank portions (for instance, 62) indicate bumps constituting the concave/convex pattern. The medium is moved from right to left, and laser light 63 irradiated through the optical head is relatively moved from A toward C. Numeral 64 designates a track pitch (a track width) and numeral 65 designates the boundary of tracks. FIG. 6(b) is a diagram showing a change in the light intensity of returning light due to a distance effect, and FIG. 6(c) is a diagram showing a change in the light intensity of returning light due to a diffraction effect caused by a step (for instance, 68) formed at a side surface of a bump in parallel to the track. FIG. 6(d) is a diagram showing a change in the light intensity of returning light in combination of the distance effect and the diffraction effect.

FIG. 7(a) is a plan view showing diagrammatically shapes of concave and convex in 3 tracks. A direction of left and right corresponds to a direction of track. When a circular disc-like recording medium is used, a vertical direction indicates a radial direction. Black-colored portions (for instance, 71) indicate concave portions constituting the concave/convex pattern, and the other portions (for instance, 72) indicate convex portions constituting the concave/convex pattern. The recording medium is moved relatively from right to left, and laser light 73 irradiated through the optical head is moved relatively from A toward C. Numeral 74 designates a track pitch (a track width) and numeral 75 designates the boundary of tracks. FIG. 7(b) is a diagram showing a signal obtained by taking differentiation of a change of the light intensity of returning light due to a distance effect in a front half portion and a rear half portion of the optical head. FIG. 7(c) is a diagram showing a signal obtained by taking differentiation of the change of the light intensity of returning light due to a diffraction effect at a step (for instance, 77) extending in a direction perpendicular to the track in the front half portion and the rear half portion of the optical head. FIG. 7(d) is a diagram showing a signal obtained by taking differentiation of the change of the light intensity of returning light in combination of the distance effect and the diffraction effect in the front half portion and the rear half portion of the optical head.

FIG. 11(a) is a diagram showing the shapes of concave and convex in a header area wherein white color portions (for instance 112) indicate convex portions and gray color portions (for instance, 111) indicate concave portions (flat portions). Right half linear portions indicate data recording areas. FIG. 11(b) is a diagram showing an output due to a distance effect, FIG. 11(c) is a diagram showing an output due to a diffraction effect, FIG. 11(d) is a diagram showing an output in combination of these effects, and FIG. 11(e) is a diagram showing a waveform obtained by the differentiation of the combined output.

FIG. 12(a) is a diagram showing shapes of concave and convex in a header area wherein some concave portions or convex portions in the header area are connected, and steps of the concave portions and the convex portions, in parallel to tracks, are shifted to a convex side with respect to the boundary of tracks. White color portions (for instance, 122) indicate convex portions and gray color portions (for instance, 121) indicate concave portions. Right half linear portions indicate data recording areas. FIG. 12(b) is a diagram showing an output due to a distance effect, FIG. 12(c) is a diagram showing an output due to a diffraction effect, FIG. 12(d) is a diagram showing an output in combination of these effects, and FIG. 12(e) is a diagram showing a waveform obtained by the differentiation of the combined output.

FIG. 13(a) is a diagram showing shapes of concave and convex in a header area wherein white color portions (for instance, 132) indicate convex portions and gray color portions (for instance, 131) indicate concave portions. Right half linear portions indicate data recording areas. FIG. 13(b) is a diagram showing an output due to a distance effect, FIG. 13(c) is a diagram showing an output due to a diffraction effect, FIG. 13(d) is a diagram showing an output in combination of these effects, and FIG. 13(e) is a diagram showing a waveform obtained by the differentiation of the combined output.

FIG. 14(a) is a diagram showing shapes of concave and convex in a header area wherein white color portions (for instance, 142) indicate convex portions and gray color portions (for instance, 141) indicate concave portions. Right half linear portions indicate data recording areas. FIG. 14(b) is a diagram showing an output due to a distance effect, FIG. 14(c) is a diagram showing an output due to a diffraction effect, FIG. 14(d) is a diagram showing an output in combination of these effects, and FIG. 14(e) is a diagram showing a waveform obtained by the differentiation of the combined output.

DETAILED DESCRIPTION OF THE PREFERRED EMBODIMENTS

Figure 1:
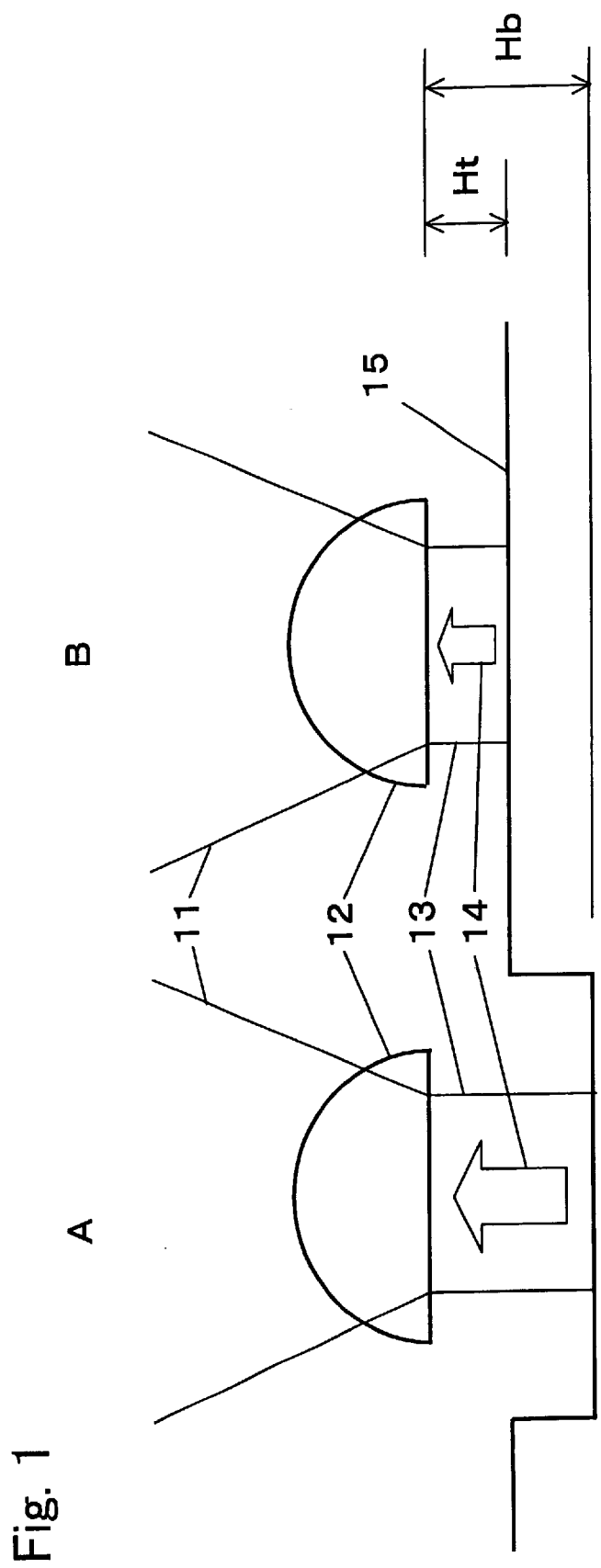
FIG. 1 is a diagram for explaining a distance effect wherein the reflectance is changed depending on the distance between a bottom surface of an optical head and a surface of near field optical recording medium, which is partially cross-sectional view showing diagrammatically shapes of concave and convex in the medium surface and the optical head.

The present invention has been achieved by finding that in a near field optical recording medium having a header area in which at least an addressing signal for reproducing an address or a timing signal for providing datum for writing an address is recorded by means of a concave/convex pattern formed in a substrate wherein recording and/or reproducing is conducted by laser light using a flying optical head, a change in returning light returned from a concave/convex portion formed in the header area includes at least a change due to a distance effect wherein the reflectance is changed depending on the distance between a bottom surface of the optical head and the substrate surface and a change due to a diffraction effect caused by a step, and that in detecting the concave/convex portion, a header information recorded by the concave/convex pattern can correctly be reproduced even in a super-high density recording medium using near field light by controlling the relation between an effect given by the distance effect and an effect by the diffraction effect.

Namely, in a first aspect of the present invention, a signal having a sufficient intensity for detecting the concave/convex portion is obtainable by providing such construction that in detecting the concave/convex portion, an effect caused by a change in the distance effect is sufficiently larger than an effect caused by a change in the diffraction effect, or by providing such construction that an effect caused by a change in the diffraction effect is sufficiently larger than an effect caused by a change in the distance effect.

Further, in a second aspect of the present invention, a signal having a sufficient intensity for detecting the concave/convex portion can be obtained by providing such construction that in detecting the concave/convex portion, an effect due to a change by the distance effect and an effect due to a change by the diffraction effect are not mutually weakened each other. In particular, when such construction that the effect due to the change by the distance effect and the effect due to the change by the diffraction effect can mutually be strengthened, it becomes possible to obtain correct reproducing of the header information easier.

In the present invention, when an effect due to a change by the distance effect and an effect due to a change by the diffraction effect mutually weaken in detecting the concave/convex portion, it is said that polarities of these signals are mutually opposite. Further, either one of the change caused by the distance effect and the change caused by the diffraction effect does not take place, the effects in detecting the concave/convex portion do not mutually weaken.

The optical recording medium is generally formed as an optical recording disc using a circular disc-like substrate. In a case of a circular disc-like recording medium, a direction of track indicates a circumferential direction and a direction perpendicular to a track indicates a radial direction (a diametrical direction).

In a case that the concave/convex pattern is constituted by concave pits or convex bumps wherein the width of the pits or the bumps in a direction perpendicular to tracks is smaller than the beam spot, these concave pits or the convex bumps can sufficiently be detected under $|Dp-Df|/(Dp+Df) \geq 0.05$ where Dp is an intensity of returning light returned to the optical head at a position just above a pit or just above a bump and Df is an intensity of returning light returned to the optical head in a flat portion in which no pit or bump is formed.

Further, when the concave/convex pattern is constituted by concave portions and convex portions adjacent to each other, and a step formed at the boundary of a concave portion and a convex portion adjacent to each other is to be detected, returning light returned to the optical head at a position just above the step formed at the boundary of the concave portion and the convex portion is divided into a concave side and a convex side, whereby such step can sufficiently be detected under $|Dc-Dd|/(Dd+Dd) \geq 0.05$ where Dc is an intensity of returning light at a concave side and Dd is an intensity of returning light at a convex side.

Further, when a signal reproduced by an effect due to a change in an intensity of reflection light, which depends on the distance between a bottom surface of the optical head and the medium surface, is larger than a signal reproduced by diffraction caused by a step in a side surface, in parallel to the track, of a pit or a bump in the header area, it is preferable that $0.7 \times \lambda/NA \leq L$ ($\lambda$: a laser wavelength and NA is a numerical apertures) where L is a length of pit or bump in a direction perpendicular to the track formed in the header area. Further, when a signal reproduced by diffraction caused by a step in a side surface, in parallel to the track, of a pit or a bump is larger than a signal reproduced by an effect due to a change in an intensity of reflection light, which depends on the distance between a bottom surface of the optical head and the medium surface in the header area, it is preferable that $0.3 \times \lambda/NA \leq L \leq 0.5 \times \lambda/NA$ ($\lambda$: a laser wavelength and NA: a numerical aperture) where L is a length of pit or bump constituting the header area, in a direction perpendicular to the track.

As a more concrete example of the near field optical recording medium of the present invention, there is provided, for instance, a near field optical recording medium wherein a pre-pit is formed in at least a surface of a substrate; at least a recording layer and a protective layer are formed on the substrate in this order, and information-recording/reproducing is conducted substantially concentrically or spirally by laser light using a flying optical head, the near field optical recording medium being characterized in that in a state of propagating near field light on the medium, returning light from the recording medium to the optical head at a position just above a step portion of a pre-pit portion is composed of reflection light from a bottom surface of a pit and a plane adjacent to the pit and diffraction light at the step portion, wherein in a case that the returning light is divided into a front half portion and a rear half portion in a direction of moving the optical head, $|Dc-Dd|/(Dc+Dd) \geq 0.05$ where Dc is an intensity of returning light in the front half portion and Dd is an intensity of returning light in the rear half portion. In this case, it is preferable that the reflectance R has a positive inclination in a range of from Ht to Ha where Ha is the distance between a bottom surface of the optical head and a bottom surface of a pit, and Ht is the distance between the bottom surface of the optical head and a plane adjacent to the pit.

Further, in a case that the concave/convex pattern is constituted by concave pits wherein the width of the pits in a direction perpendicular to the track is smaller than the beam spot, and when Ht is the distance between a bottom surface of the optical head and a flat portion in which no pit is formed, and Ha is the distance between the bottom surface of the optical head and a bottom surface of a pit, a layer in which the reflectance R has a negative inclination in a range of from Ht to Ha should be used whereby an effect due to a change caused by the distance effect and an effect due to a change caused by the diffraction effect in detecting the concave/convex portion can mutually be strengthened. In this case, it is preferable that the height of the step provided by the pit is from 30 to 100 nm.

As a concrete example of the near field optical recording medium of the present invention, there is provided, for instance, a near field optical recording medium wherein a pre-pit comprising concave pits is formed in at least a surface of a substrate; at least a recording layer and a protective layer are formed on the substrate in this order, and information-recording/reproducing is conducted substantially concentrically or spirally by laser light using a flying optical head, the near field optical recording medium being characterized in that in a state of propagating near field light on the medium, returning light from the medium to the optical head at a position just above a pit includes reflection light and diffraction light from the medium, wherein when Ht is the distance between a bottom surface of the optical head and a flat portion in which no pit is formed, and Ha is the distance between the bottom surface of the optical head and a bottom surface of the pit, the reflectance R has a negative inclination in a range of from Ht to Ha. In such case, $|Da-Dt|/(Da+Dt) \geq 0.05$ is easily obtainable wherein Da is an intensity of returning light to the optical head at a position just above the pit, and Dt is an intensity of returning light to the optical head in a flat portion in which no pit is formed.

Further, in a case that the concave/convex pattern is constituted by convex bumps wherein the width of the bumps in a direction perpendicular to the track is smaller than the beam spot, and when Ht is the distance between a bottom surface of the optical head and a flat portion in which no bump is formed, and Hb is the distance between the bottom surface of the optical head and an upper surface of the bump, a layer in which the reflectance R has a positive inclination in a range of from Hb to Ht should be used, whereby an effect due to a change by the distance effect and an effect due to a change by the diffraction effect in detecting the concave/convex portion can mutually be strengthened. In this case also, it is preferable that the height of the step formed by the bump is from 30 to 100 nm.

As a more concrete example of the near field optical recording medium of the present invention, there is provided, for instance, a near field optical recording medium wherein a pre-pit comprising convex bumps is formed in at least a surface of a substrate; at least a recording layer and a protective layer are formed on the substrate in this order, and information-recording/reproducing is conducted substantially concentrically or spirally by laser light using a flying optical head, the near field optical recording medium being characterized in that in a state of propagating near field light on the medium, returning light from the medium to the optical head at a position just above a bump includes reflection light and diffraction light from the medium, wherein when Ht is the distance between a bottom surface of the optical head and a flat portion in which no bump is formed, and Ha is the distance between the bottom surface of the optical head and an upper surface of a bump, the reflectance R has a positive inclination in a range of from Hb to Ht. In this case also, $|Dt-Db|/(Dt+Db) \geq 0.05$ where Db is an intensity of returning light to the optical head at a position just above a bump, and Dt is an intensity of returning light to the optical head in a flat portion in which no bump is formed, is easily obtainable.

Further, in a case that the concave/convex pattern is constituted by concave portions and convex portions which are adjacent to each other, and when Hc is the distance between a bottom surface of the optical head and a bottom surface of a concave portion, and Hd is the distance between the bottom surface of the optical head and an upper surface of a convex portion, a layer in which the reflectance R has a positive inclination in a range of from Hd to Hc should be used, whereby an effect due to a change by the distance effect and an effect due to a change by the diffraction effect can mutually be strengthened in detecting the concave/convex portion. In this case, it is preferable that when concave portions or convex portions in the concave/convex pattern formed in the header area are at an equivalent position in adjacent tracks, the concave portions or the convex portions are connected in a direction perpendicular to the tracks by bridging the adjacent tracks. Further, it is preferable that when concave portions or convex portions are not at an equivalent position in adjacent tracks, a step formed at the boundary of a concave portion and a convex portion, which are adjacent to each other in adjacent tracks, is shifted to a side of the track in which the convex portion is formed, with respect to the boundary of the adjacent tracks. Further, it is preferable that the height of the step formed by the boundary of the concave portion and the convex portion is from 30 to 100 nm.

Figure 9:
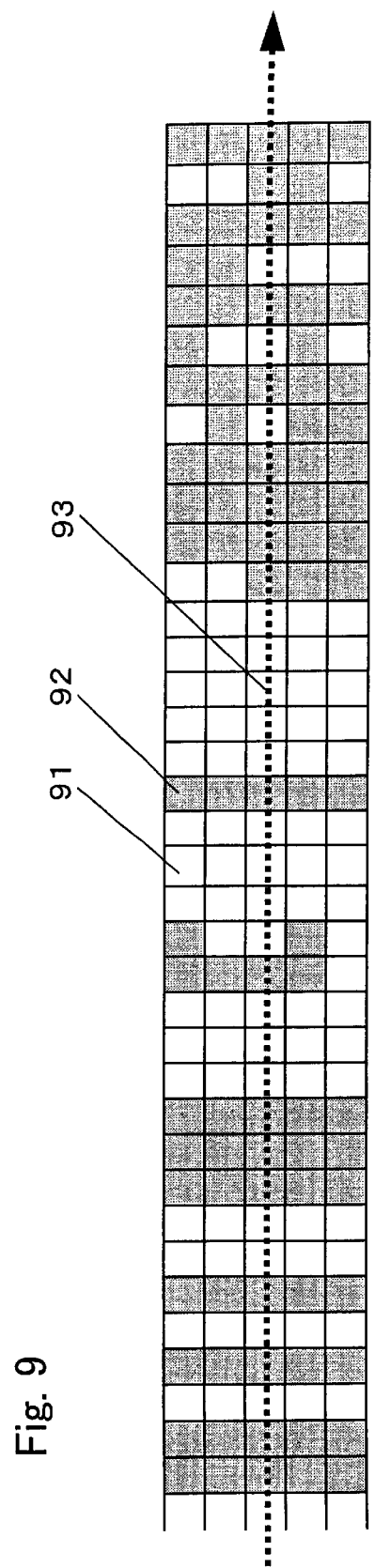
FIG. 9 is a diagram showing a pre-pit pattern in the substrate of Embodiment 4 of the present invention. A direction of left and right corresponds to a direction of track, and a vertical direction corresponds to a direction perpendicular to tracks. In the figure, 5 tracks are shown wherein white color portions (for instance, 91) indicate concave portions and gray color portions (for instance, 92) indicate convex portions. An arrow mark 93 indicates a direction of scanning by the beam spot.

"An equivalent position in adjacent tracks" or "an equivalent position in a circumferential direction in adjacent tracks" in the present invention imply two positions which are substantially adjacent in two adjacent tracks when a position on a track is considered as a minimum unit as shown, for instance, in FIG. 9. When a circular disc-like recording medium is used, the equivalent position is preferably on a linear line passing through the center of the recording medium in a case that the optical head is moved linearly. Further, when the optical head is moved along a circular arc, the equivalent position is preferably on a curve line along a locus of the movement.

As a more concrete example of the near field optical recording medium of the present invention, there is provided, for instance, a near field optical recording medium having a header area in which a header information including at least a signal for reproducing an address or a timing signal for providing datum for writing an address is recorded by means of a concave/convex pattern formed in a substrate wherein recording and/or reproducing is conducted by laser light using a flying optical head, the near field optical recording medium being characterized in that an intensity of returning light from a concave/convex portion forming the concave/convex pattern is changed depending on the distance between a bottom surface of the optical head and the medium surface, and a polarity of a signal reproduced by an effect due to such change of the intensity of returning light is not opposite to a polarity of a signal reproduced by diffraction.

In this case, it is preferable that when Hc is the distance between a bottom surface of the optical head and a bottom surface of a concave portion forming the concave/convex pattern, and Hd is the distance between the bottom surface of the optical head and an upper surface of a convex portion forming the concave/convex pattern, a layer having the properties that the reflectance R has a positive inclination in a range of from Hd to Hc is used, and wherein when there are concave portions at an equivalent position in a circumferential direction in adjacent tracks among concave portions and convex portions which constitute the header area, these concave portions are connected in a direction perpendicular to the tracks, and when there are convex portions at an equivalent position in a circumferential direction in adjacent tracks, these convex portions are separated in a direction perpendicular to the tracks and the width of each convex portion in a direction perpendicular to each track is at least smaller than the width of the tracks.

Further, it is preferable that a layer having the properties that the reflectance R has a positive inclination in a range of from Hd to Hc is used and that when there are concave portions or convex portions at an equivalent position in a circumferential direction in adjacent tracks among concave portions and convex portions which constitute the header area, the concave portions or the convex portions are connected in a direction perpendicular to the tracks, and when there are a concave portion and a convex portion at an equivalent position in a circumferential direction in adjacent tracks, the boundary of the concave portion and the convex portion which are adjacent to each other in the adjacent tracks is shifted to a side of the convex portion with respect to the boundary of the tracks.

Further, it is preferable that a layer having the properties that the reflectance R has a negative inclination in a range of from Hd to Hc is used, and that when there are convex portions at an equivalent position in a circumferential direction in adjacent tracks among concave portions and convex portions which constitute the header area, these convex portions are connected in a direction perpendicular to the tracks, and when there are concave portions at an equivalent position in a circumferential direction in adjacent tracks, these concave portions are separated in a direction perpendicular to the tracks and the width of each concave portion in a direction perpendicular to each track is at least smaller than the width of the tracks.

The above-mentioned each structure of the present invention can be applied to a recording medium wherein information-recording and/or reproducing is conducted by using either one of lands and grooves; a recording medium wherein information-recording and/or reproducing is conducted by using both lands and grooves and wherein a land track and a groove track which are adjacent to each other have different header information, or a recording medium wherein paired land track and groove track which are adjacent to each other have a header information in common.

In the following, the present invention will be described in more detail.

FIG. 1 is a partially cross-sectional view showing diagrammatically an example of shapes of concave and convex formed in a surface of a near field optical recording medium. In FIG. 1, a direction of left and right indicates a direction of track, and the recording medium is moved from right to left. Laser light 11 is irradiated through SIL 12 provided on an optical head, and near field light 13 is incident into the recording medium 15. Numeral 14 designates reflection light from the recording medium 15. At this moment, there takes place a phenomenon that the intensity of reflection light changes depending on a change (Hb-Ht) in the distance between a bottom surface of SIL and the medium surface due to multiplex interference of light irradiated through SIL 12. Namely, there is a difference between the intensity of reflection light, i.e., the intensity of returning light to the optical head at a position A and a position B of the optical head. In the present invention, such effect is called a distance effect. The relation of an increase or a decrease in the distance effect, namely, the intensity of reflection light (the intensity of returning light) depending on the distance between the bottom surface of SIL and the medium surface can be controlled by contriving the structure of multi-layers laminated on the substrate, i.e., the kind, the layer thickness, the refractive index and so on of each of the layers to be laminated.

In the present invention, when the distance between the bottom surface of the optical head (the bottom surface of SIL) and the medium surface is increased with the result that the intensity of reflection light (the intensity of returning light) is increased, it is said that the layer has a positive inclination. On the other hand, when the distance between the bottom surface of the optical head (the bottom surface of SIL) and the medium surface is decreased with the result that the intensity of reflection light (the intensity of returning light) is increased, it is said that the layer has a negative inclination.

Figure 2:
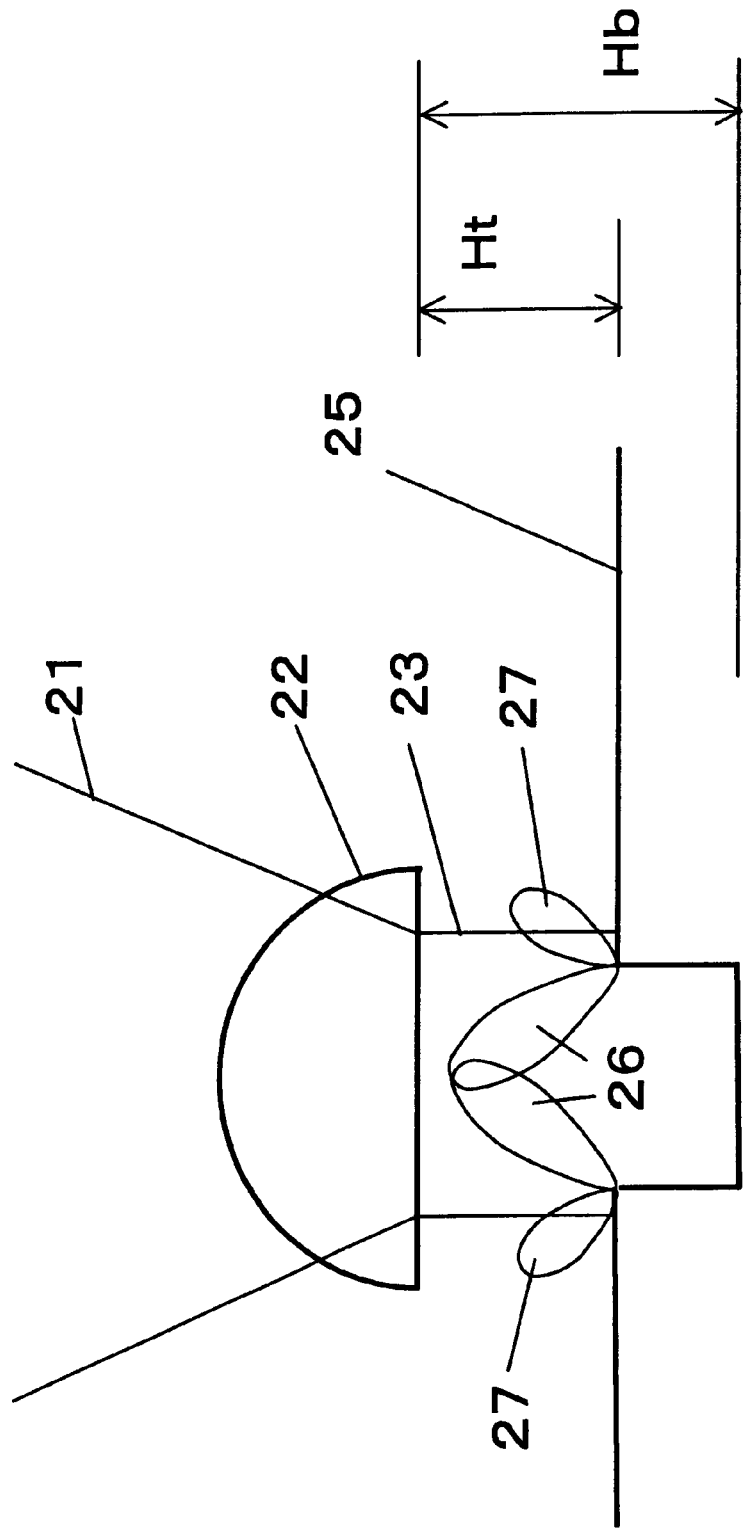
FIG. 2 is a diagram for explaining a diffraction effect due to a step at a side face of pit in parallel to a track, which is partially cross-sectional view showing diagrammatically shapes of concave and convex in a surface of near field optical recording medium and an optical head.

FIG. 2 is a partially cross-sectional view showing diagrammatically an example of shapes of concave and convex formed in a surface of a near field optical recording medium. In FIG. 2, a direction of left and right indicates a direction perpendicular to a track, and the medium is moved from a front side of the paper to a rear side of it. Laser light 21 is irradiated through SIL 22 provided on an optical head, and near field light 23 is incident into the recording medium 25. Numerals 26, 27 designate light diffracted by a step in each side surface of a pit. The diffracted light 26 enters as returning light again into SIL 22. However, light 27 does not return to SIL 22 whereby the intensity of returning light decreases for the light 27. In the present invention, such phenomenon is called a diffraction effect caused by a step.

Figure 3:
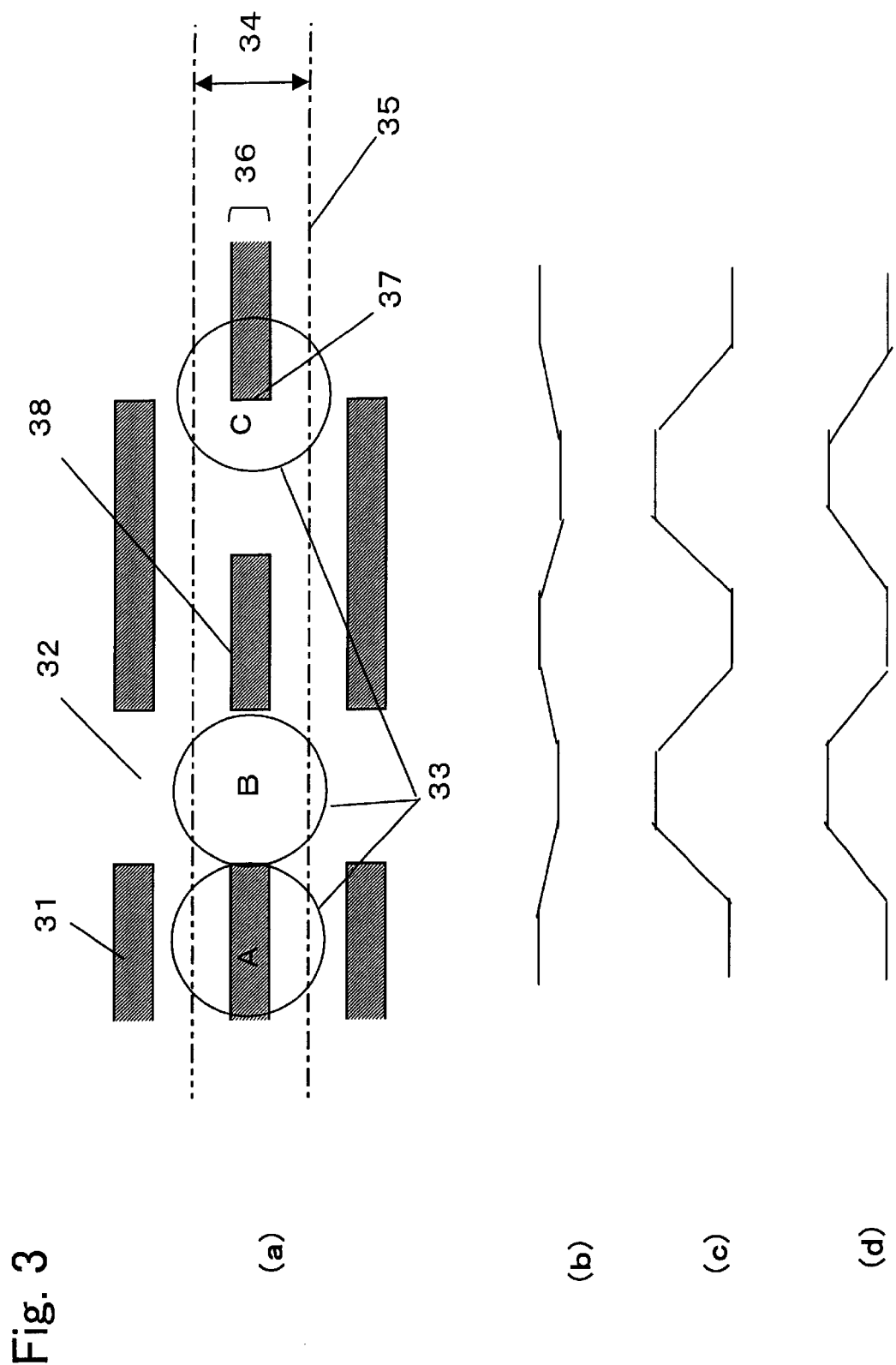
FIG. 3 is a diagram showing an example of a concave/convex pattern constituted by concave pits having a width in a direction perpendicular to tracks, which is narrower than the beam spot, and an example of a readout signal in a case of using a layer having a positive inclination in the near field optical recording medium.

FIG. 3 is a diagrammatical view showing an example of a concave/convex pattern formed in the near field optical recording medium of the present invention in which the concave/convex pattern is constituted by concave pits wherein the width in a direction perpendicular to a track is narrower than the beam spot, and an example of a readout signal in a case that a layer having a positive inclination is used. This figure shows that concave pits are dispersed.

In the present invention, a header signal having a high quality can be obtained by forming pits or bumps so as to satisfy a formula of $0.05 \leq |Dp-Df|/(Dp+Df)$ where Dp is an intensity of returning light returned to the optical head at a pit portion or a bump portion, and Df is an intensity of returning light in a flat portion. In this case, when a signal reproduced by the distance effect is larger than a signal reproduced by the diffraction effect, the length L in a direction perpendicular to the track of the pit or a bump is preferably in a range of $0.7 \cdot \lambda/NA \leq L$ ($\lambda$: a laser wavelength and NA: a numerical aperture). Further, when a signal reproduced by the diffraction effect is larger than a signal reproduced by the distance effect, the length L in a direction perpendicular to the track of the pit or a bump is preferably in a range of $0.3 \cdot \lambda/NA \leq L \leq 0.5 \cdot \lambda/NA$ ($\lambda$: a laser wavelength and NA: a numerical aperture).

In FIG. 3, the concave/convex pattern is constituted by pits dispersed in an isolated state. However, the same effect is obtainable in a case that it is constituted by bumps dispersed in an isolated state.

Figure 4:
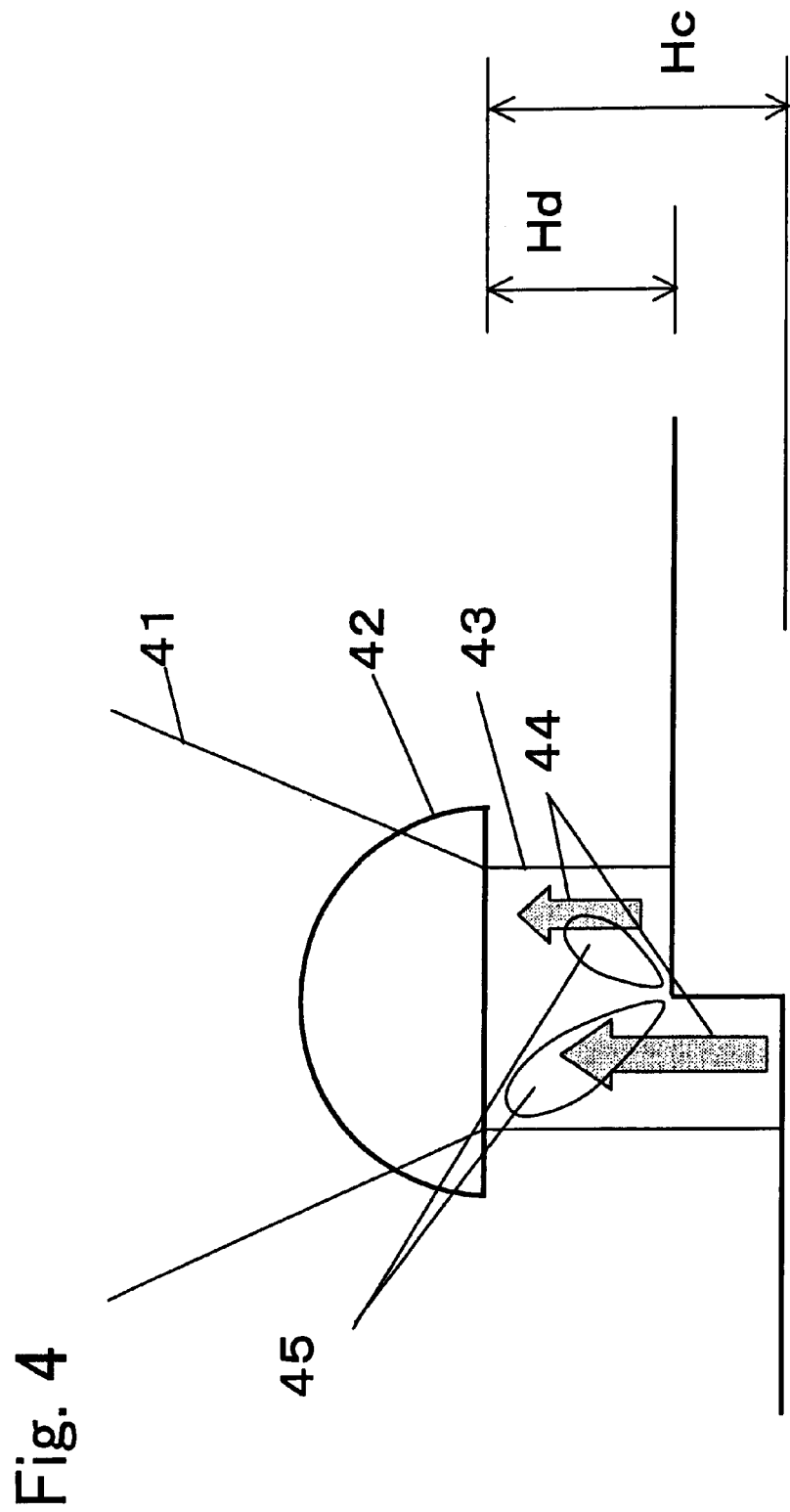
FIG. 4 is a diagram for explaining a distance effect and a diffraction effect in a case that an optical head is just above a step formed at the boundary of a concave portion and a convex portion adjacent in a direction of track, which is partially cross-sectional view showing diagrammatically shapes of concave and convex in a surface of near field optical recording medium and the optical head.

FIG. 4 is a partially cross-sectional view in a case that an optical head is located just above a step portion formed at the boundary (a boundary extending in a direction perpendicular to a track) of a concave portion and a convex portion which are adjacent in a direction of a track. In FIG. 4, a direction of left and right indicates a direction of track, and the medium is moved from right to left. Laser light 41 is irradiated through SIL 42 provided on an optical head, and near field light 43 is incident into the recording medium. Numerals 44 designate reflection light from the recording medium respectively. Numerals 45 designate diffraction light caused by a step formed at the boundary of the concave portion and the convex portion. In the near field optical recording medium of the present invention, the returning light to the optical head is divided into a concave side and a convex side. Then, a header signal having a high quality is obtainable by forming shapes of concave and convex so as to satisfy a formula of $|Dc-Dd|/(Dc+Dd) \geq 0.05$ where Dc is an intensity of returning light at the concave side and Dd is an intensity of returning light at the convex side. A header information signal can be detected by a method of taking a difference to the returning light intensity in front and rear half portions of the optical head with use of a half-split type photodetector or the like.

Figure 5:
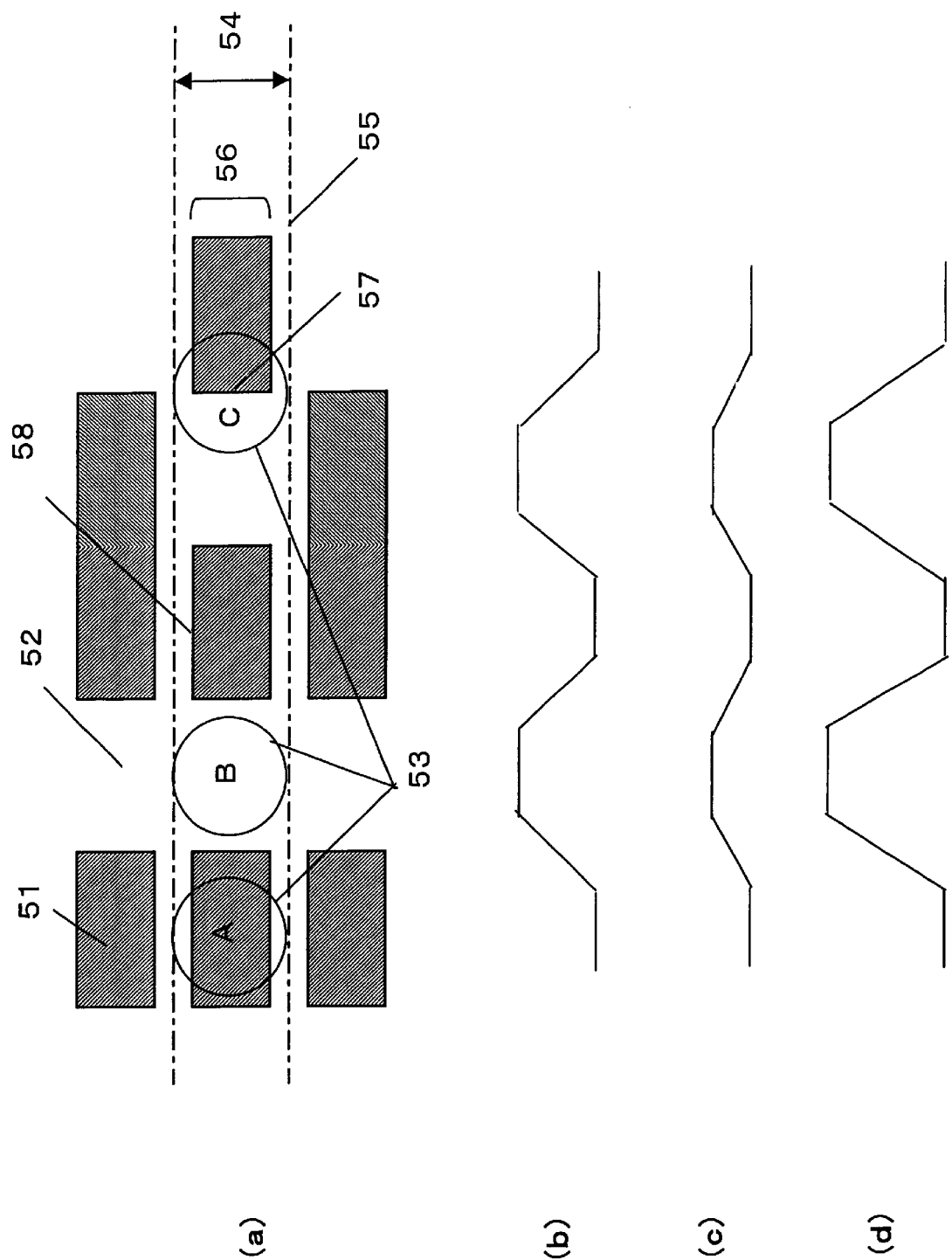
FIG. 5 is a diagram showing an example of a concave/convex pattern constituted by concave pits having a width in a direction perpendicular to tracks, which is narrower than the beam spot, and an example of a readout signal in a case of using a layer having a negative inclination in the near field optical recording medium of the present invention.

FIG. 5 is a diagram showing the near field optical recording medium of the present invention wherein a header information is constituted by concave pits each having the width in a direction perpendicular to a track being narrower than the beam spot and wherein the reflectance R has a negative inclination in a range of from Ht to Ha where Ht is the distance between a bottom surface of the optical head and a flat portion in which no pit is formed, and Ha is the distance between the bottom surface of the optical head and a bottom surface of a pit.

FIG. 5(b) shows a change in the intensity of light due to the distance effect, and FIG. 5(c) shows a change in the intensity of light due to the diffraction effect caused by a step 58 in a side surface of a pit, which is in parallel to the track. With respect to a change in a signal due to the distance effect, since a layer structure that the reflectance R has a negative inclination in a range of from Ht to Ha is used, the intensity of reflection light at a position that the beam is above the pit is lower than a position B where no pit is formed. Further, with respect to the diffraction effect, the intensity of reflection light at a position A on the pit is lower than that at a position B where no pit is formed because there is diffraction of light caused by the step in a side surface of the pit.

FIG. 5(d) shows an effect in combination of (b) and (c). In this case, both a signal due to the diffraction effect and a signal due to the distance effect are summed, whereby the amplitude of a finally obtainable signal is large and a signal of high quality can be obtained.

It is preferable from the viewpoint of making the formation of the substrate easy that the depth of pits is in a range of from 30 nm to 100 nm. Further, it is preferable to form pits so as to satisfy a formula of $0.05 \leq |Dp-Df|/(Dp+Df)$ where Dp is an intensity of returning light to the optical head at a pit portion, and Df is an intensity of returning light in a flat portion in which no pit is formed.

Figure 6:
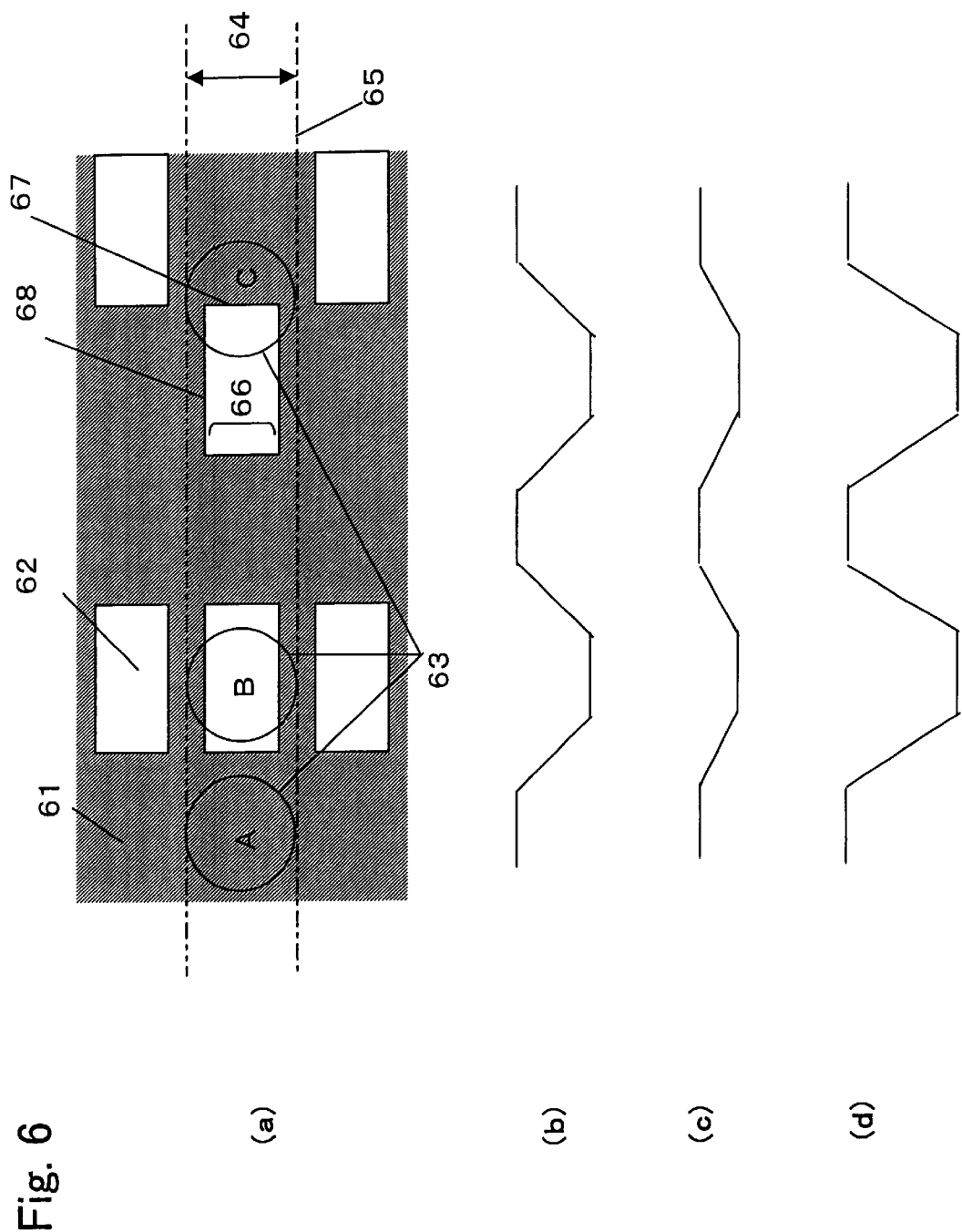
FIG. 6 is a diagram showing an example of a concave/convex pattern constituted by convex bumps having a width in a direction perpendicular to tracks, which is narrower than the beam spot, in the near field optical recording medium of the present invention, and an example of a readout signal in a case of using a layer having a negative inclination.

FIG. 6 is a diagram showing the near field optical recording medium of the present invention wherein a header information is constituted by convex bumps having the width in a direction perpendicular to a track being narrower than the beam spot, and wherein the reflectance R has a positive inclination in a range of from Hb to Ht where Ht is the distance between a bottom surface of the optical head and a flat portion in which no bump is formed, and Hb is the distance between the bottom surface of the optical head and an upper surface of the bump.

FIG. 6(b) shows a change in the intensity of light due to the distance effect, and FIG. 6(c) shows a change in the intensity of light due to the diffraction effect caused by a step 68 in a side surface of a pit, which is in parallel to the track. With respect to a change in a signal due to the distance effect, since a layer structure that the reflectance R has a positive inclination in the range of from Hb to Ht is used, the intensity of reflection light at a position B where the beam is above a bump is lower than that at a position A where no bump is formed. Further, with respect to the diffraction effect, the intensity of reflection light at a position B above a bump is lower than that at a position A where no bump is formed due to the diffraction of light caused by the step in a side surface of the bump.

FIG. 6(d) shows an effect in combination of (b) and (c). In this case, both a signal due to the diffraction effect and signal due to the distance effect are summed, whereby the amplitude of a finally obtainable signal is large and a signal of good quality can be obtained. It is preferable from the viewpoint of making the formation of the substrate easy that the depth of pits is in a range of from 30 nm to 100 nm. Further, it is preferable to form bumps so as to satisfy a formula of $0.05 \leq |Dp-Df|/(Dp+Df)$ where Dp is an intensity of returning light to the optical head in a bump portion, and Df is an intensity of returning light in a flat portion in which no bump is formed.

In the near field optical recording medium of the present invention wherein a header information is constituted by concave portions and convex portions which are adjacent to each other, and the reflectance R has a positive inclination in a range of from Hc to Hd where Hc is the distance between a bottom surface of the optical head and a bottom surface of a concave portion, and Hd is the distance between the bottom surface of the optical head and an upper surface of a convex portion as shown in FIG. 4 (hereinbelow, the near field optical recording medium having such construction is called the near field optical recording medium A), a difference between returning light in a front half portion of the optical head and returning light in a rear half portion can be increased, and in relation to a change in the intensity of light due to the diffraction effect, it is possible to detect a signal of high quality at a step portion having a difference of height by using an appropriate detection means (e.g., a differential detection means such as a half-split type photodetector) (such differential detecting method is referred to as an edge detection method). It is preferable from the viewpoint of making the formation of the substrate easy that the difference of height of a concave or convex is in a range of from 30 nm to 100 nm. Further, it is preferable to form shapes of concave and convex so as to satisfy a formula of $|Dc-Dd|/(Dc+Dd) \geq 0.05$ where Dc is an intensity of returning light at a concave side and Dd is an intensity of returning light at a convex side in a case that returning light to the optical head at a position just above a step portion of the concave and convex is divided into a concave side and a convex side.

Figure 7:
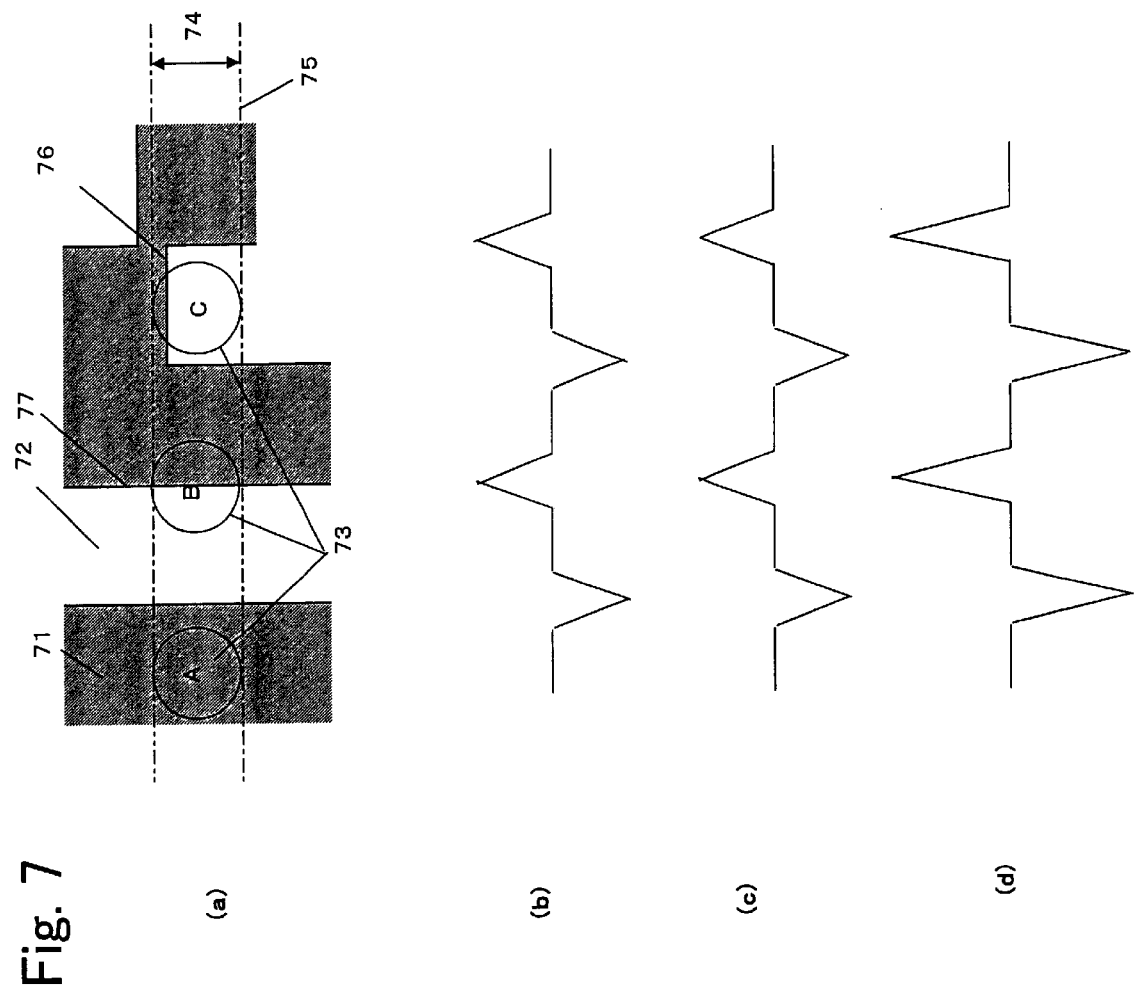
FIG. 7 is a diagram showing an example of a concave/convex pattern constituted by concave portions and convex portions which are adjacent to each other, and an example of a readout signal in a case of using a layer having a positive inclination, in the near field optical recording medium of the present invention.

FIG. 7 is a diagram showing an example of a concave/convex pattern in the near field optical recording medium A wherein the concave/convex pattern in the header area is constituted by concave portion and convex portions which are adjacent to each other.

FIG. 7(b) shows a signal obtained by taking a difference to a change in the intensity of light due to the distance effect in a front half portion and a rear half portion of the optical head. When the beam is at a position A, there is no difference in the intensities of light in the front half portion and the rear half portion of the optical head, and therefore, there is no change in an output voltage. At a position B that the beam is above the boundary of a concave and a convex, the intensity of reflection light in the front half portion of the optical head on the concave portion is larger than that in the rear half portion of the head due to the distance effect, and accordingly, the difference produces a signal as shown in (b).

FIG. 7(c) shows a signal obtained by taking a difference to a change in the intensity of light due to the diffraction effect, which is caused by a step (for instance, 77) extending in a direction perpendicular to the track, in a front half portion and a rear half portion of the optical head. When the beam is at a position A, there is no difference in the intensity of light in the front half portion and the rear half portion of the optical head, and therefore, there is no change in an output voltage. At a position B above the boundary of a concave and a convex, the intensity of reflection light in the front half portion of the optical head on the concave portion is larger than that in the rear half portion of the optical head on the convex portion due to the diffraction effect, and accordingly, the difference produces a signal as shown in (c).

When the beam is at a position C, a diffraction signal from a side surface in parallel to the track is added. It was found that by forming the boundary 76 of concave and convex in parallel to the track at a convex side with respect to the boundary of the tracks, an excellent signal could be obtained.

As described above, in the near field optical recording medium A, it is preferable to form concave portions or convex portions constituting a concave/convex pattern in the header area at an equivalent position in adjacent tracks, wherein the concave portions or the convex portions are connected in a radial direction by bridging the adjacent tracks. Further, it is preferable that when concave portions or convex portions are not at an equivalent position in adjacent tracks, the boundary of a step in parallel to the tracks is shifted to a convex side with respect to the boundary of the tracks.

Figure 8:
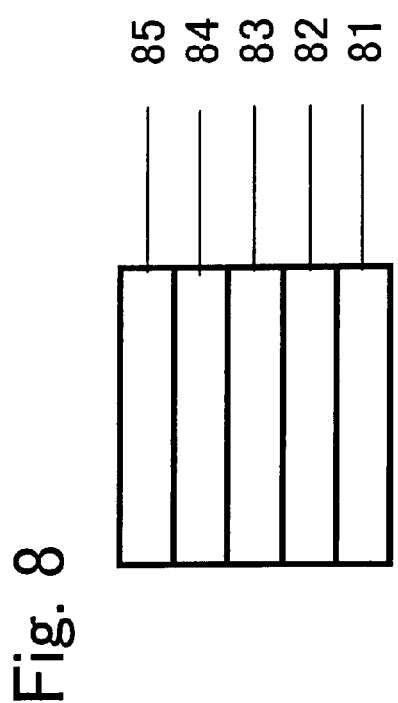
FIG. 8 is a partly cross-sectional view showing an example of a lamination structure of the near field optical recording medium of the present invention wherein a reflection layer 82 a recording layer 83, a protective layer 84 and a liquid lubricant layer 85 are laminated on a substrate 81.

Next, the medium structure of the near field optical recording medium of the present invention will be described. FIG. 8 is a partly cross-sectional view of an embodiment of the near field optical recording medium of the present invention. On a substrate 81, a reflection layer 82, a recording layer 83, a protective layer 84 and a liquid lubricant layer 85 are laminated.

For the substrate 81, there is in particular no limitation as far as a substrate satisfies the properties as the medium substrate, such as mechanical properties. Glass, polycarbonate, amorphous polyolefin, engineering plastics and so on may be used. A pattern formed in the header area according to the present invention is formed on a resinous substrate with use of a stamper by an injection-molding method or a UV curing method. The stamper is prepared by exposing a resist-formed original plate to light by controlling laser beams according to an output from a formater for producing pattern forming signals and by Ni or the like by an electroforming method based on the obtained patterned original plate. Further, in a case of using glass, it can be formed by using a UV curing resin by 2P method.

For the reflection layer 82, a material exhibiting a high reflectance to a laser wavelength used, such as a noble metal, Cu, Al or the like, is used. The reflection layer may be formed by using an alloy of these metals or an alloy of one of these metal and another metal in order to assure durability. When the layer thickness of the recording layer 83 is sufficiently large, the reflection layer 82 may be eliminated. Further, a dielectric layer as an interlayer composed of AlN, SiN, GeN, $Ta_2O_5$, ZnS—$SiO_2$ and so on may be formed between the recording layer 83 and the reflection layer 82.

In magneto-optical recording, the recording layer 83 is made of a layer of amorphous rare earth transition metal having a large perpendicular magnetic anisotropy such as TbFeCo, TbDyFeCo, NdDyFeCo or the like, or an artificial layer of Pt/Co or the like. The layer thickness of the recording layer 83 is preferably in a range of from 10 nm to 200 nm. When the recording layer is used as a single layer, the more preferable layer thickness of the recording layer 83 is in a range of from 15 nm to 40 nm in consideration of SNR. The recording layer 83 is not always a single layer but it may be a lamination with a layer for increasing sensitivity of magnetic field for recording such as GdFeCo, or a lamination with an interlayer or a reproduction layer of magnetically induced super resolution. Further, the recording layer 83 may be added with an anticorrosion element such as Cr, Ti, Zr, Nb, Ta or the like to increase anticorrosion properties or added with several atomic % of Nd in order to increase the Kerr rotation angle in a short wavelength.

Further, in a case of phase-change recording, the recording layer 83 is made of a material such as GeSbTe, AgInSbTe or the like wherein the optical constant changes between crystalline and amorphous. The layer thickness of the recording layer 83 is preferably from 10 nm to 40 nm.

Further, in a case of a recording medium of write-once type (a supplement type), the recording layer 83 is made of a pigment layer such as cyanine, phthalocyanine, naphtalocyanine or the like, which may be formed by spin coating.

On the recording layer 83, a transparent protective layer 84 made of a material such as AlN, SiN, GeN, $Ta_2O_5$, ZnS—$SiO_2$, or a resin having a high hardness is formed. Since the protective layer 84 serves to protect the recording layer; increases an efficiency of absorbing light to the recording layer, and serves to increase a quantity of change of reflection light before and after the recording, designing to the thickness is made to provide the optimum condition in consideration of a laser wavelength used, the layer thickness of the recording layer and so on. It is preferable that the layer thickness is in a range of from 10 nm to 90 nm. The recording medium of write-once type can function without the protective layer 84. However, it is preferable to form the protective layer in order to protect the recording layer 84 in a state that the head is floated. The protective layer 84 may have a multi-layer structure. For example, a layer of a material such as diamond-like carbon (DLC) having excellent hardness and self-lubricating properties may be formed on SiN. Here, the DLC layer is formed by adding hydrogen and/or nitrogen to carbon.

The liquid lubricant layer 85 is made of a lubricant such as perfluoroether, silicon oil or the like in order to provide good flying properties to a flying head. The layer thickness of the liquid lubricant layer 85 is preferably from 0.2 nm to 4 nm.

An overcoat layer of a material such as an acrylic type photo-curable resin may be interposed between the protective layer 84 and the liquid lubricant layer 85. In this case, the liquid lubricant layer may be eliminated.

In the present invention, the shapes of concave and convex having a header information and a soft format type in which a header information is recorded later by the same technique as the recording of data can be used in combination. In this case, it is preferable that grooves shallower than that in the data area are formed in the soft format area in consideration of flying characteristics of the head.

Further, it is preferable from the viewpoint of flying characteristics of the head that the header area is formed at least broader than a radial range of $d_1-W/2 \sim d_2+W/2$ ($d_1$: the radius of an inner periphery of a head-accessing region, $d_2$: the radius of an outer periphery of the head-accessing region and W: the width of the head slider).

The recording system for a data area in the near field optical recording medium of the present invention can be applied to any of the system for recording data in a land portion, the system for recording data in a groove portion, a system of recording data in both a land portion and a groove portion and a sample-servo system.

As described above, the near field optical recording medium of the present invention is so constructed as to have a header area in which at least an addressing signal for reproducing an address or a timing signal for providing datum for writing an address is recorded in a substrate by means of a concave/convex pattern wherein recording and/or reproducing is conducted by laser light using a flying optical head, and wherein when a concave/convex portion which constitutes the concave/convex pattern is to be detected, either one of an effect due to a change in returning light caused by a distance effect wherein the reflectance is changed depending on the distance between a bottom surface of the optical head and the substrate surface and an effect due to a change in returning light caused by a diffraction effect at a step is sufficiently larger than the other, or the effect due to a change in returning light caused by the distance effect and the effect due to a change in returning light caused by the diffraction effect are not weakened each other, whereby a header information recorded by the concave/convex pattern in the substrate surface can correctly be reproduced even in a super-high density recording medium using near field light.

EXAMPLES

In the following, the present invention will be described in detail with reference to Examples. However, the present invention is by no means restricted by such specific Examples.

Example 1

Substrates made of polycarbonate, having a flat header portion in which concave pits were formed as shown in FIG. 3(a), were prepared by an injection-molding method. The track pitch 34 is 500 nm. On each substrate, Au having a layer thickness of 50 nm, TbFeCoTa having a layer thickness of 20 nm, a SiN layer having a layer thickness of 210 nm and diamond-like carbon (DLC) having a layer thickness of 10 nm were formed respectively by sputtering. After the formation of the DLC layer, a perfluoropolyether type lubricant layer was coated in a thickness of 1 nm by a lifting method. Thus, near field optical recording media were prepared. In this case, the width of the pits was X nm and the height of the pits was Y, and various near field optical recording media in which values of X and Y were changed, were prepared.

Example 2

Near field optical recording media were prepared by the same method as in Example 1 except that convex bumps were formed in a flat header portion.

The near field optical recording media of Examples 1 and 2 were rotated at a linear velocity of 10 m/s to float a slider SIL head to a height of 80 nm. Power for reproducing was adjusted to 1.3 mW, and reflection light of laser was measured with an oscilloscope to detect changes of voltage. Further, error rates of the header were also measured. The wavelength of laser light irradiated through SIL head is 685 nm and the effective numerical aperture of SIL head is 1.3.

Results of measurement are shown in Tables 1 and 2.

TABLE 1

(Example 1)

| Pit height [nm] | Pit width [λ/NA] | \|Dp-Df\|/ (Dp + Df) | Signal [mV] | Error rate |
|---|---|---|---|---|
| 50 | 0.2 | 0.03 | 8 | Unmeasurable |
| 50 | 0.25 | 0.05 | 15 | $5.9 \times 10^{-4}$ |
| 50 | 0.3 | 0.23 | 40 | $6.1 \times 10^{-5}$ |
| 50 | 0.5 | 0.25 | 45 | $5.8 \times 10^{-5}$ |
| 50 | 0.6 | 0.15 | 38 | $8.0 \times 10^{-5}$ |
| 50 | 0.7 | 0.09 | 25 | $9.0 \times 10^{-5}$ |
| 50 | 0.8 | 0.06 | 20 | $9.5 \times 10^{-5}$ |
| 90 | 0.2 | 0.03 | 9 | Unmeasurable |
| 90 | 0.25 | 0.05 | 16 | $5.8 \times 10^{-4}$ |
| 90 | 0.5 | 0.20 | 38 | $8.8 \times 10^{-5}$ |
| 90 | 0.6 | 0.24 | 40 | $8.0 \times 10^{-5}$ |
| 90 | 0.7 | 0.60 | 113 | $4.7 \times 10^{-5}$ |
| 90 | 0.9 | 0.59 | 110 | $4.8 \times 10^{-5}$ |

Pit width is normalized by λ/NA.

TABLE 2

(Example 2)

| Bump height [nm] | Bump width [λ/NA] | \|Dp-Df\|/ (Dp + Df) | Signal [mV] | Error rate |
|---|---|---|---|---|
| 50 | 0.2 | 0.03 | 9 | Unmeasurable |
| 50 | 0.25 | 0.05 | 17 | $5.7 \times 10^{-4}$ |
| 50 | 0.3 | 0.40 | 68 | $4.5 \times 10^{-5}$ |
| 50 | 0.5 | 0.48 | 83 | $3.8 \times 10^{-5}$ |
| 50 | 0.6 | 0.30 | 52 | $7.0 \times 10^{-5}$ |
| 50 | 0.7 | 0.18 | 31 | $8.1 \times 10^{-5}$ |
| 50 | 0.8 | 0.10 | 17 | $8.5 \times 10^{-5}$ |
| 90 | 0.2 | 0.03 | 11 | Unmeasurable |
| 90 | 0.25 | 0.05 | 16 | $5.8 \times 10^{-4}$ |
| 90 | 0.5 | 0.35 | 66 | $6.5 \times 10^{-5}$ |

TABLE 2-continued (Example 2)

| Bump height [nm] | Bump width [λ/NA] | \|Dp-Df\|/ (Dp + Df) | Signal [mV] | Error rate |
|---|---|---|---|---|
| 90 | 0.6 | 0.48 | 91 | $5.8 \times 10^{-5}$ |
| 90 | 0.7 | 0.65 | 121 | $3.3 \times 10^{-5}$ |
| 90 | 0.9 | 0.55 | 103 | $3.5 \times 10^{-5}$ |

Pit width is normalized by λ/NA.

It is found from Tables 1 and 2 that when |Dp−Df|/(Dp+Df)≧0.05, sufficient reproducing signals can be obtained, and practical error rates can be obtained. Further, it was found that when samples of disc having a layer thickness of SiN of 235 nm were prepared, the reflectance R did not substantially change in a range of from 30 nm to 180 nm in terms of the distance between a bottom surface of SIL and the medium surface, with respect to light having a wavelength of 685 nm. The intensity of signal obtained at this moment was determined as the intensity of signal due to a diffraction effect, and it was compared with the intensity of signal due to a distance effect obtained from calculation. As a result, there was found that in a substrate in which the step of a pit or a bump was 50 nm, diffraction effect>distance effect, and in a substrate in which the step of a pit or a bump was 90 nm, distance effect>diffraction effect. From these facts, it was found that in the case of distance effect>diffraction effect, a high error rate is resulted under a condition of 0.7·λ/NA≦L, and in the case of diffraction effect>distance effect, a high error rate is resulted under a condition of 0.3·λ/NA≦L≦0.5·λ/NA/

Example 3

Substrates made of polycarbonate, having a concave/convex-shaped header portion as shown in FIG. 3 were prepared by an injection-molding method. The track pitch 34 is 500 nm. On each substrate, Au having a layer thickness of 50 nm, TbFeCoTa having a layer thickness of 20 nm, a SiN layer having a layer thickness of 210 nm and diamond-like carbon (DLC) having a layer thickness of 10 nm were formed respectively by sputtering. After the formation of the DLC layer, a perfluoropolyether type lubricant layer was coated in a thickness of 1 nm by a lifting method. Thus, near field optical recording media were prepared. In this case, the width of pits was X nm and the height of the pits was Y, and various near field optical media in which values of X and Y were changed, were prepared.

The near field optical recording media of Example 3 were rotated at a linear velocity of 10 m/s to float a SIL head to a height of 80 nm. Power for reproducing was adjusted to 1.3 mW, and a difference of the intensity of light at a front half portion and a rear half portion of the head was detected with a half-split detector. The intensity of returning light at the front half portion is represented by Dc, and the intensity of returning light at the rear half portion is Dd. Changes of output voltage at this moment was measured with an oscilloscope, and error rates of the header were also measured. The wavelength of laser light irradiated through the SIL head is 685 nm and the numerical aperture of the SIL head is 1.3. Results of measurement are shown in Table 3.

TABLE 3

(Example 3)

| Pit height [nm] | Pit width [λ/NA] | \|Dc−Dd\|/(Dc + Dd) | Signal [mV] | Error rate |
|---|---|---|---|---|
| 50 | 0.2 | 0.03 | 9 | Unmeasurable |
| 50 | 0.25 | 0.05 | 20 | $3.5 \times 10^{-4}$ |
| 50 | 0.3 | 0.31 | 47 | $2.0 \times 10^{-4}$ |
| 50 | 0.5 | 0.61 | 92 | $1.0 \times 10^{-4}$ |
| 50 | 0.7 | 0.75 | 113 | $8.5 \times 10^{-5}$ |
| 50 | 0.9 | 0.83 | 126 | $6.0 \times 10^{-5}$ |
| 90 | 0.2 | 0.03 | 7 | Unmeasurable |
| 90 | 0.25 | 0.05 | 21 | $5.0 \times 10^{-4}$ |
| 90 | 0.3 | 0.20 | 30 | $3.5 \times 10^{-4}$ |
| 90 | 0.5 | 0.50 | 76 | $1.5 \times 10^{-4}$ |
| 90 | 0.7 | 0.63 | 96 | $9.8 \times 10^{-5}$ |
| 90 | 0.9 | 0.75 | 114 | $8.5 \times 10^{-5}$ |

Pit width is normalized by λ/NA.

It is found from Table 3 that when $|Dc-Dd|/(Dc+Dd) \geq 0.05$, sufficient reproducing signals can be obtained, and practical error rates can be obtained.

Example 4

A substrate made of polycarbonate having guide grooves with a track pitch of 0.45 μm was prepared by injection-molding. In this case, a pre-pit in the shape as shown in FIG. 9 was formed. The depth of the pre-pit is 50 nm. On the substrate, Au having a layer thickness of 50 nm, TbFeCoTa having a layer thickness of 20 nm, a SiN layer having a layer thickness of 210 nm and diamond-like carbon (DLC) having a layer thickness of 10 nm were formed respectively by sputtering. After the formation of the DLC layer, a perfluoropolyether type lubricant layer was coated in a thickness of 1 nm by a lifting method. Thus, a near field magneto-optical medium was prepared.

Example 5

A near field magneto-optical recording medium was prepared by the same method as in Example 4 except that the layer thickness of the SiN layer was 260 nm.

To the near field magneto-optical recording media of Examples 4 and 5, tests for reproducing the pre-pit were conducted by using a slider SIL head (flying height: 100 nm) having a laser wavelength of 680 nm and an effective numerical aperture of 1.2 and a half-split photodetector. Hd was 100 nm and Hc was 140 nm.

The dependence of the reflectance R on the flying height of the head in a flat portion (a mirror portion) of the medium surfaces in which no pit or groove (guide groove) was formed, was examined. As a result, it was found in the near field magneto-optical recording medium of Example 4 that the reflectance had a positive inclination in a range of flying height of from 50 to 180 nm because the signal intensity in such range exhibited a positive inclination. Further, it was found in the near field magneto-optical recording medium of Example 5 that the reflectance had a negative inclination in a range of flying height of from 50 to 180 nm because the signal intensity in such range exhibited a negative inclination.

Figure 10:
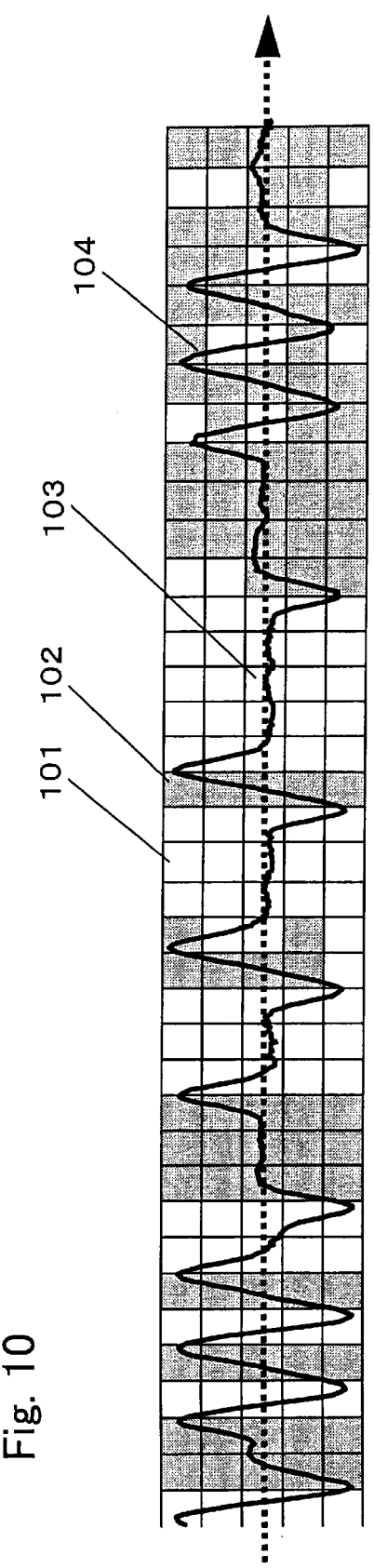
FIG. 10 is a diagram showing a reproducing signal to the pre-pit shown in FIG. 9. A curve line indicates the reproducing signal.

Next, the waveform of a signal obtained by reproducing the pre-pit by scanning the near field magneto-optical recording medium of Example 4 with the head in the direction indicated by an arrow mark 93 in FIG. 9 is shown by 104 in FIG. 10. It is found that the detected signal is reproduced largely in response to each pit.

In comparison, a sufficient reproduction signal could be obtained even when the near field magneto-optical recording medium of Example 5 was scanned with the head in the direction indicated by the arrow mark 93 in FIG. 9 although the signal was smaller than that in the near field magneto-optical recording medium of example 4.

Values of $|Dc-Dd|/(Dc+Dd)$ on the optical recording medium of Example 4 and the optical recording medium of Example 5 were 0.16 and 0.07, respectively.

Further, in an attempt to detect the pre-pit in the near field magneto-optical recording medium of Example 4 by utilizing a sum signal of diffraction light in the same manner as the conventional method, a sufficient signal to detect the pits could not be obtained.

Example 6

Figure 11:
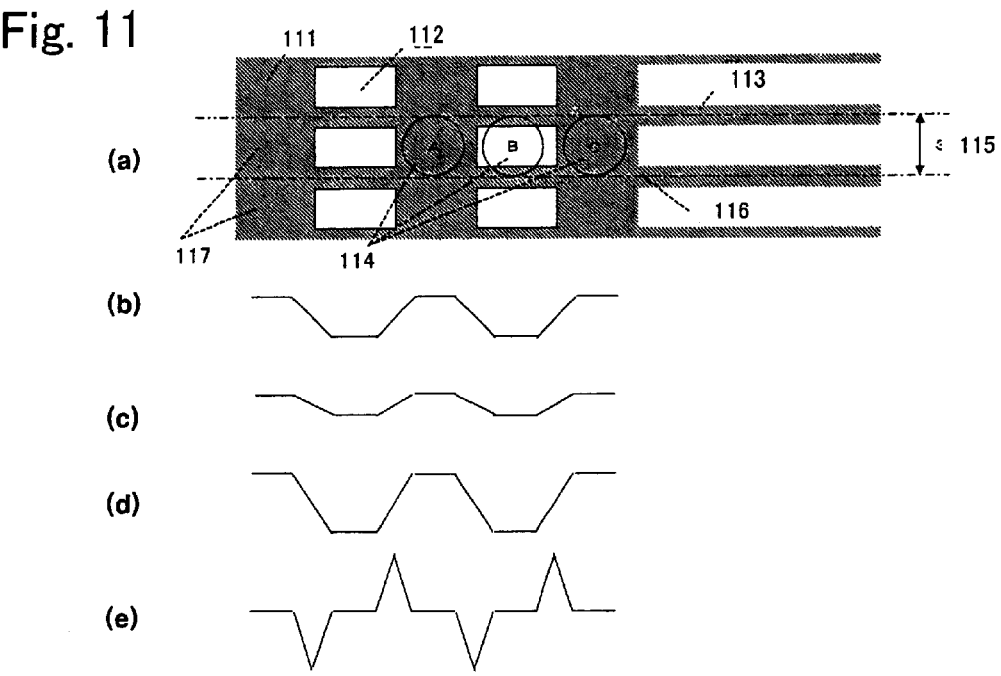
FIG. 11 shows a concave/convex pattern in the substrate of Embodiment 6 of the present invention, which is a diagram showing an output waveform of a change of the reflectance obtained when a layer having a positive inclination is used as an example.

A stamper having a concave/convex-shaped header portion as shown in FIG. 11 and guide grooves with a track pitch of 450 nm was formed by using an original plate of glass having a thickness of resist of 60 nm by a mastering process, and a substrate of polycarbonate was prepared by injection-molding. The difference of height of concave/convex of the substrate was 52 nm in the measurement by AFM. On the substrate, Au having a layer thickness of 50 nm, TbFeCoTa having a layer thickness of 20 nm, a SiN layer having a layer thickness of 210 nm and diamond-like carbon (DLC) having a layer thickness of 10 nm were formed respectively by sputtering. In this layer structure, the reflectance R indicates a positive inclination in a range of from 30 nm to 150 nm in terms of the distance between a bottom surface of SIL and the medium surface. After the formation of the DLC layer, a perfluoropolyether type lubricant layer was coated in a thickness of 1 nm by a lifting method. Thus, a magneto-optical medium was prepared. The difference of height of concave/convex after the formation of layers was 47 nm in the AFM measurement. Further, the full width at half maximum in a radial direction of a convex portion in the substrate at this moment was 390 nm.

Example 7

Figure 12:
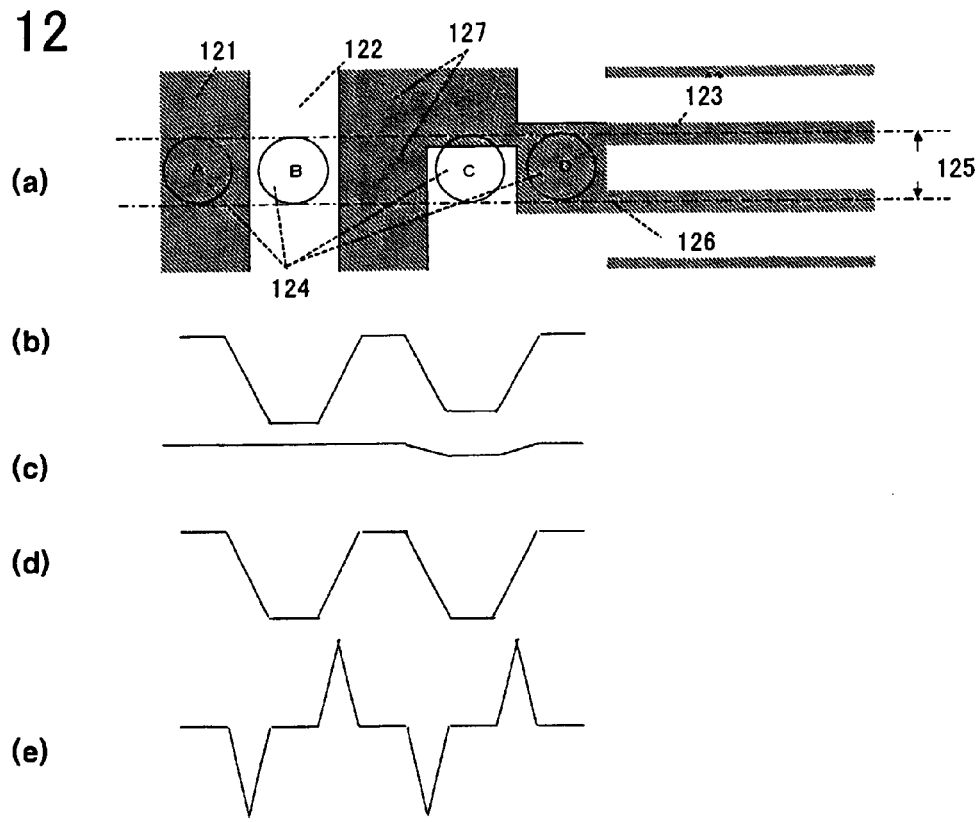
FIG. 12 shows a concave/convex pattern in the substrate of Embodiment 7 of the present invention, which is a diagram showing an output waveform of a change of the reflectance obtained when a layer having a positive inclination is used as an example.

A surface-readout type magneto-optical recording medium having a concave/convex shape as shown in FIG. 12 was prepared by the same method as in Example 6. In this example, however, concave portions and convex portions were arranged as described below by increasing power in a mastering process for forming concave portions. Namely, in a case that concave portions were at an equivalent position in a circumferential direction in adjacent tracks, the concave portions were connected in a radial direction, and in a case that concave portions were not adjacent at an equivalent position in a circumferential direction in adjacent tracks, the boundary of a concave portion and a convex portion in a direction perpendicular to the tracks was shifted to a side of the convex portion with respect to the boundary of the adjacent tracks. Further, in forming the header portion where when convex portions were at an equivalent position in a circumferential direction in adjacent tracks, these convex portions were connected in a radial direction by turning off the beam for forming the grooves. Thus, a concave/convex pattern was formed so that when concave portions or convex portions were at an equivalent position in a circumferential direction in adjacent tracks, the width of a concave portion or a convex portion in a radial direction in the track was wider than the track pitch; when concave portions or convex portions were not at an equivalent position in a circumferential direction in adjacent tracks, the width of a concave portion in a radial direction in the track was wider than the track pitch, and when concave portions or convex portions were not at an equivalent position in a circumferential direction in adjacent tracks, the width of a convex portion in a radial direction in the track was narrower than the track pitch. In the measurement by AFM, the full width at half maximum in a radial direction of a convex portion interposed by concave portions at both sides in a radial direction of the substrate at this moment was 390 nm and the full width at half maximum in a radial direction of a concave portion interposed by convex portions at both sides in a radial direction was 510 nm.

Example 8

A surface-readout type magneto-optical recording medium having shapes of concave and convex as shown in FIG. 12 was prepared by the same method as in Example 7. In this Comparative Example, however, an original plate of glass having a thickness of resist of 45 nm was used. In the measurement by AFM, the difference of height of concave and convex of the substrate at this moment was 35 nm, and the difference of height of the concave and convex after the formation of layers was 32 nm. Further, in the measurement by AFM, the full width at half maximum in a radial direction of a convex portion interposed by concave portions at both sides in a radial direction of the substrate at this moment was 380 nm, and the full width at half maximum in a radial direction of a concave portion interposed by convex portions at both sides in a radial direction was 530 nm.

Example 9

A surface-readout type magneto-optical recording medium having shapes of concave and convex as shown in FIG. 12 was prepared by the same method as in Example 7. In this Comparative Example, however, an original plate of glass having a thickness of resist of 120 nm was used. In the measurement by AFM, the difference of height of concave and convex of the substrate at this moment was 104 nm, and the difference of height of the concave and convex after the formation of layers was 98 nm. Further, in the measurement by AFM, the full width at half maximum in a radial direction of a convex portion interposed by concave portions at both sides in a radial direction of the substrate at this moment was 370 nm, and the full width at half maximum in a radial direction of a concave portion interposed by convex portions at both sides in a radial direction was 520 nm.

Comparative Example 1

Figure 13:
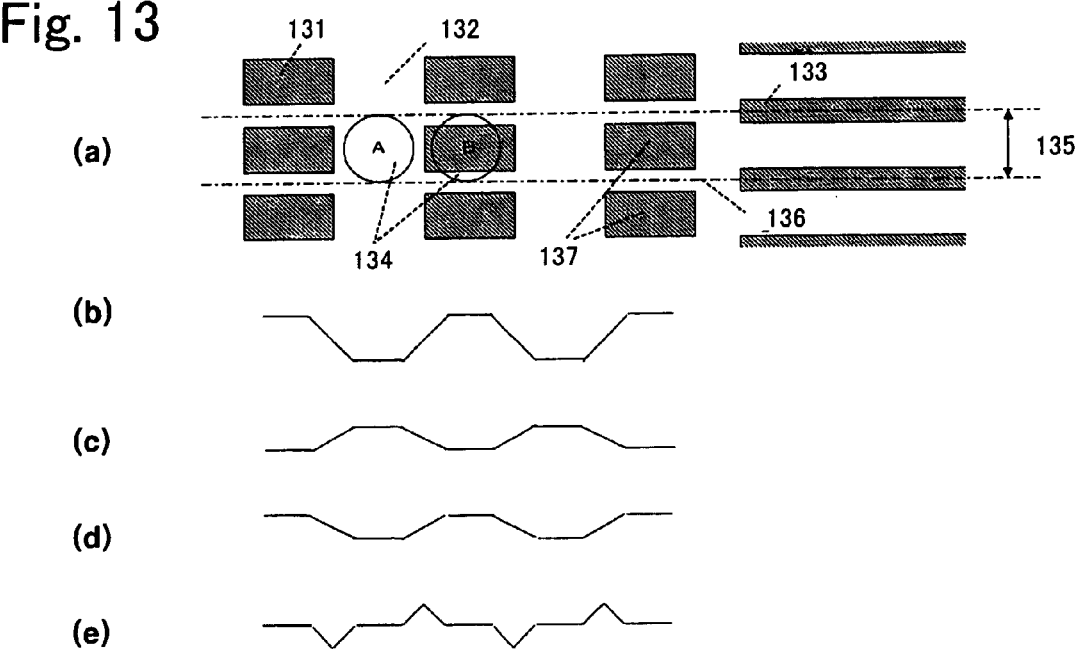
FIG. 13 shows a concave/convex pattern in the substrate of Comparative Example 1 of the present invention, which is a diagram showing an output waveform of a change of the reflectance obtained when a layer having a positive inclination is used as example.

A surface-readout type magneto-optical recording medium having conventional shapes of concave and convex as shown in FIG. 13 was prepared by the same method as in Example 6. In the measurement by AFM, the full width at half maximum in a radial direction of a concave portion of the substrate at this moment was 350 nm.

Example 10

Figure 14:
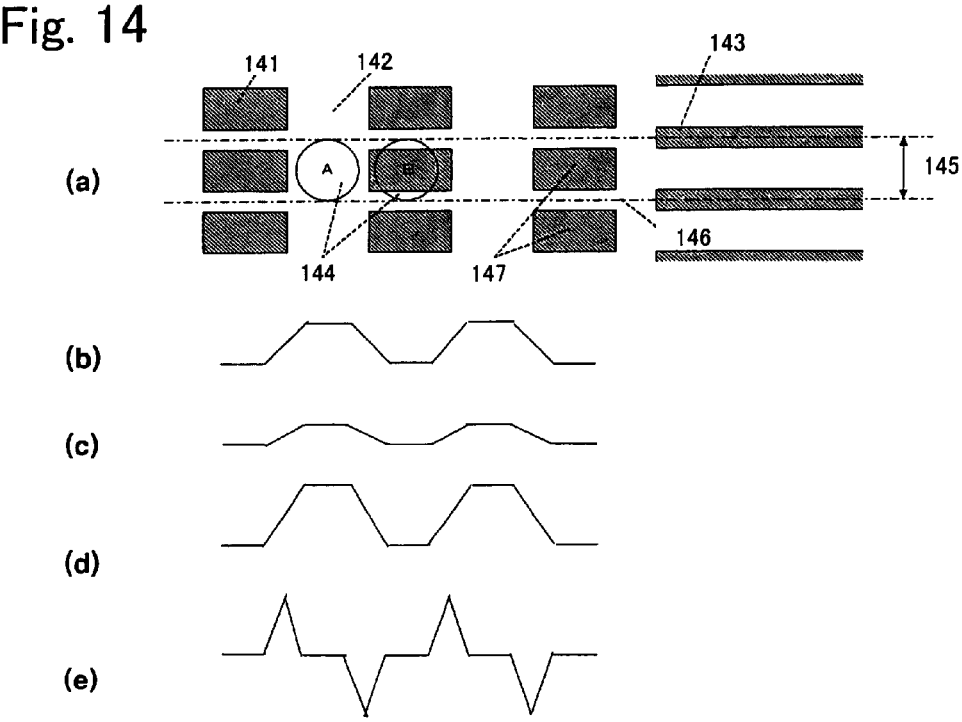
FIG. 14 shows a concave/convex pattern in the substrate of Embodiment 10 of the present invention, which is a diagram showing an output waveform of a change of the reflectance obtained when a layer having a negative inclination is used for example.

A stamper having a concave/convex-shaped header portion as shown in FIG. 14 and guide grooves with a track pitch of 450 nm was formed by using an original plate of glass having a thickness of resist of 60 nm by a mastering process, and a substrate of polycarbonate was prepared by injection-molding. The difference of height of concave and convex of the substrate in the measurement by AFM was 52 nm. On this substrate, Au having a layer thickness of 50 nm, TbFeCoTa having a layer thickness of 20 nm, a SiN layer having a layer thickness of 260 nm and diamond-like carbon (DLC) having a layer thickness of 10 nm were formed respectively by sputtering. In this layer structure, the reflectance R has a negative inclination in a range of from 30 nm to 150 nm in terms of the distance between a bottom surface of SIL and the medium surface. After the formation of the DLC layer, a perfluoropolyether type lubricant layer was coated in a thickness of 1 nm by a lifting method. Thus, a magneto-optical medium was prepared. The difference of height of the concave and convex after the formation of layers in the measurement by AFM was 46 nm. Further, the full width at half maximum in a radial direction of a concave portion of the substrate at this moment was 350 nm.

Each 3 magneto-optical recording media of a layer structure having a positive inclination, according to Examples 6 to 9 and Comparative Example 1, were prepared respectively. The tests as described below were conducted to these media.

Each medium was rotated at a linear velocity of 10 m/s to float the SIL head to a height of 80 nm. A laser power of 1.3 mW was irradiated, and reflection light of laser was detected based on a differential output from a half-split detector for dividing the SIL head into a front half portion and a rear half portion. Output voltages at this moment were measured with an oscilloscope, and an average value of 3 media was calculated. At this time, the wavelength of laser light irradiated through the SIL head was 680 nm, the effective numerical aperture of the SIL head was 1.4 and the effective diameter of laser light on the layer surface was 480 nm. Further, error rates of the header were measured by using a drive having the same function as mentioned above. In this case too, an average value of 3 media was calculated. Further, with use of this drive, the presence or absence of a signal, which might be generated in a portion in which any signal should not be detected (hereinbelow, referred to as an extra noise) was observed with an oscilloscope. Results of the measurement are shown in Table 4.

TABLE 4

|  | Example 6 | Example 7 | Example 8 | Example 9 | Comparative Example 1 |
| --- | --- | --- | --- | --- | --- |
| Signal voltage of header | 61 mV | 81 mV | 42 mV | 90 mV | 8.1 mV |
| Error rate of header | $1.3 \times 10^{-4}$ | $1.8 \times 10^{-5}$ | $2.4 \times 10^{-3}$ | $1.5 \times 10^{-3}$ | Unmeasurable |
| Extra noise | Nil | Nil | Nil | Generated | Nil |

In the case of Example 6, the header reproducing signal was good, and the error rate of the header was in a usable range.

In the case of Example 7, the header reproducing signal became further large in comparison with the case of Example 6, and the error rate of the header was further improved.

In the case of Example 8, the header reproducing signal became small in comparison with the cases of Example 6 and Example 7 because of a reduction of the distance effect. However, the reproduction of the header signal was possible.

In the case of Example 9, the header reproducing signal could be large in comparison with the cases of Example 7 and Example 8. However, an extra noise was generated. However, the reproduction of the header signal was possible.

In the case of Comparative Example 1, the header reproducing signal could not substantially be obtained, and the measurement of error rate of the header by the drive was impossible.

3 Magneto-optical recording media of the layer structure having a negative inclination according to Example 10 were prepared. The tests as described below were conducted to these media.

Each medium was rotated at a linear velocity of 10 m/s to float the SIL head to a height of 80 nm. A laser power of 1.3 mW was irradiated, and reflection light of laser was detected based on a differential output from the half-split detector for dividing the SIL head into a front half portion and a rear half portion. Output voltages at this time were measured with the oscilloscope, and an average value of 3 media was calculated. At this time, the wavelength of laser light irradiated through the SIL head was 680 nm; the effective numerical aperture of the SIL head was 1.4, and the effective diameter of laser light on the layer surface was 480 nm. Further, error rates of the header were measured by using a drive having the same function as described above. In this case too, an average value of 3 media was calculated. Further, the presence or absence of a signal which may generate in a portion in which any signal should not be detected (hereinbelow, referred to as an extra noise) was observed with the oscilloscope. Results of the measurement are shown in Table 5.

TABLE 5

|  | Example 10 |
|---|---|
| Signal voltage of header | 60 mV |
| Error rate of header | 2.4 × 10$^{-4}$ |
| Extra noise | Nil |

In the case of Example 10, the header reproducing signal was good and the error rate of the header was good.

Example 11

Substrates of polycarbonate having guide grooves with a track pitch of 0.45 μm were prepared by injection-molding. In this case, a pre-pit comprising concave pits indicated by 151a in FIG. 15 was formed. The depth of the pits was 50 nm. On each substrate, Au having a layer thickness of 50 nm, TbFeCoTa having a layer thickness of 20 nm, a SiN layer having a layer thickness of 260 nm and DLC having a layer thickness of 10 nm were formed respectively by sputtering. After the formation of the DLC layer, a perfluoropolyether type lubricant layer was coated in a thickness of 1 nm by a lifting method. Thus, near field magneto-optical recording media were prepared. In this case, the width of the pits was X nm, and various near field magneto-optical recording media in which the value of X was changed, were prepared.

Comparative Example 2

A substrate of polycarbonate having guide grooves with a track pitch of 0.45 μm was prepared by injection-molding. In this case, a pre-pit comprising concave pits indicated by 151a in FIG. 15 was formed. The depth of the pits was 50 nm. On the substrate, Au having a layer thickness of 50 nm, TbFeCoTa having a layer thickness of 20 nm, a SiN layer having a layer thickness of 210 nm and a DLC layer having a layer thickness of 10 nm were formed respectively by sputtering. After the formation of the DLC layer, a perfluoropolyether type lubricant layer was coated in a thickness of 1 nm by a lifting method. Thus, a near field magneto-optical recording medium was prepared.

Tests for reproducing the pre-pit were conducted by using sum signals to the near field magneto-optical recording media of Example 11 and Comparative Example 2 with use of a slider SIL head (flying height: 100 nm) having a laser wavelength of 680 nm and an effective numerical aperture of 1.2. Ht was 100 nm and Ha was 145 nm.

The dependence of the reflectance R on the flying height of the head in a flat portion (a mirror portion) of the medium surfaces in which no pit or groove was formed, was examined. As a result, it was found in the near field magneto-optical recording media of Example 11 that the reflectance exhibited a negative inclination in a range of flying height of from 80 to 180 nm because the signal intensity exhibited a negative inclination in such range. On the other hand, it was found in the near field magneto-optical recording medium of Comparative Example 1 that the reflectance had a positive inclination in a range of flying height of from 80 to 180 nm because the signal intensity obtained in such range exhibited a positive inclination.

Figure 15:
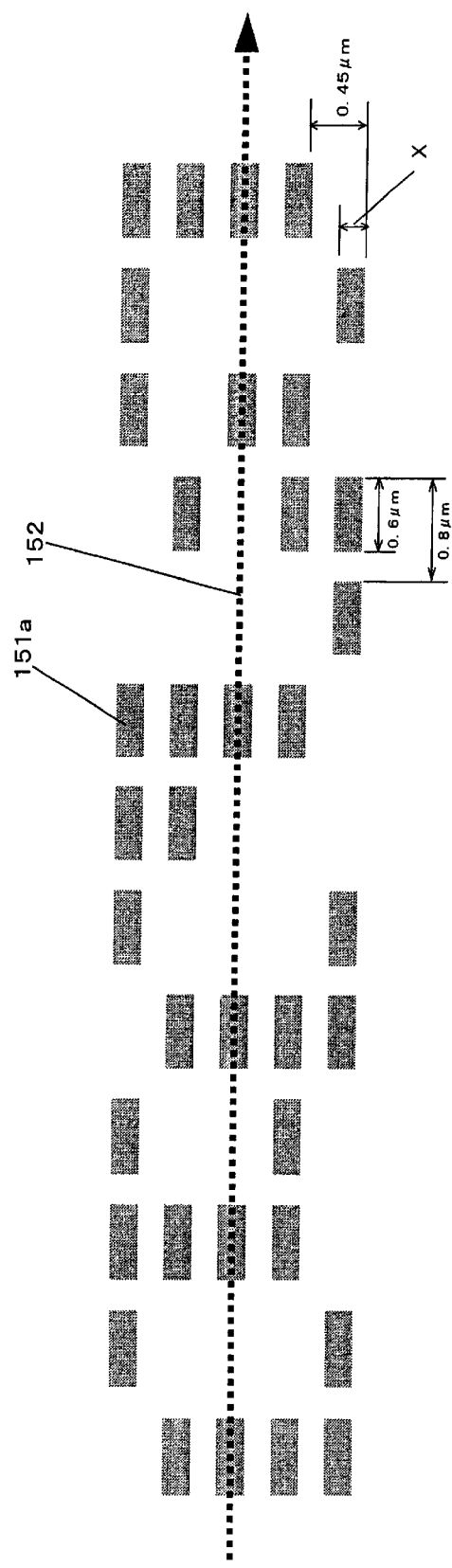
FIG. 15 shows a concave/convex pattern in the substrate of Embodiment 11 of the present invention wherein gray color portions (for instance, 151a) indicate concave portions. A direction of left and right corresponds to a direction of track, and a vertical direction corresponds to a direction perpendicular to tracks. The figure shows only 5 tracks.
Figure 16:
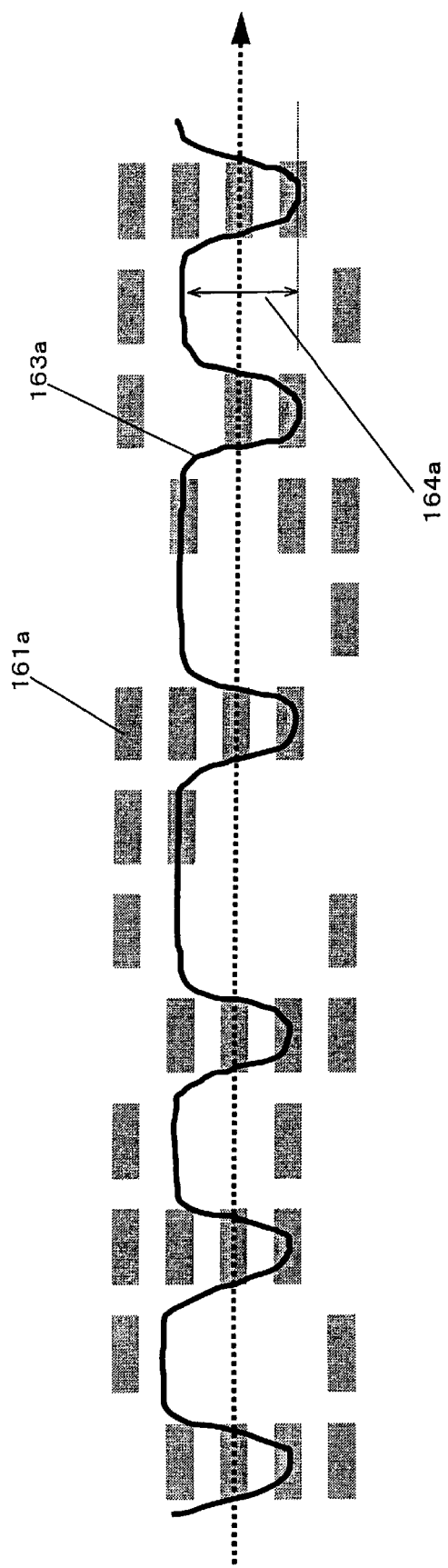
FIG. 16 is a diagram showing a reproducing signal to the pre-pit shown in FIG. 15. A curve line 163a indicates the reproducing signal obtained by scanning the pre-pit in a direction of the arrow mark 152 in FIG. 15.

The waveform of a signal obtained by reproducing the pre-pit by scanning the near field magneto-optical recording medium (X=0.23 μm) of Example 11 with the head in a direction indicated by an arrow mark 152 in FIG. 15, is indicated by 163a in FIG. 16. It is found that detection signals are reproduced largely in response to each pit. Further, the pit width (d/Tp) dependence of the amplitude of the signal 164a in FIG. 16 normalized by (Da+Dt) is shown in Table 6.

Further, in an attempt to detect the pre-pit in the near field magneto-optical recording medium of Comparative Example 2 by the same method as in Example 12, sufficient signals for detecting the pits could not be obtained.

TABLE 6

| d/Tp | \|Da-Dt\|/(Da + Dt) |
|---|---|
| 0.1 | 0.06 |
| 0.2 | 0.14 |
| 0.5 | 0.53 |
| 0.7 | 0.42 |

Example 12

Substrates of polycarbonate having guide grooves with a track pitch of 0.45 μm were prepared by injection-molding. In this case, a pre-pit comprising convex bumps as indicated by 171b in FIG. 17 was formed. The height of the bumps was 50 nm. On each substrate, Au having a layer thickness of 50 nm, TbFeCoTa having a layer thickness of 20 nm, a SiN layer having a layer thickness of 210 nm and a DLC layer having a layer thickness of 15 nm were formed respectively by sputtering. After the formation of the DLC layer, a perfluoropolyether type lubricant layer was coated in a thickness of 1 nm by a lifting method. Thus, near field magneto-optical recording media was prepared. In this case, the width of the bumps was X nm, and various near field magneto-optical recording media in which the value of X was changed, were prepared.

Comparative Example 3

A substrate of polycarbonate having guide grooves with a track pitch of 0.45 μm was prepared by injection-molding. In this case, a pre-pit comprising convex bumps as indicated by 171b in FIG. 17 was formed. The height of the bumps was 50 nm. On the substrate, Au having a layer thickness of 50 nm, TbFeCoTa having a layer thickness of 20 nm, a SiN layer having a layer thickness of 260 nm and a DLC layer having a layer thickness of 15 nm were formed respectively by sputtering. After the formation of the DLC layer, a perfluoropolyether type lubricant layer was coated in a thickness of 1 nm by a lifting method. Thus, a near field magneto-optical recording medium was prepared.

Tests for reproducing the pre-pit were conducted by using sum signals to the near field magneto-optical recording media of Example 12 and Comparative Example 3 with use of a slider SIL head (flying height: 100 nm) having a laser wavelength of 680 nm and an effective numerical aperture of 1.2. Ht was 100 nm and Hb was 55 nm.

The dependence of the reflectance R on the flying height of the head in a flat portion (a mirror portion) of the medium surfaces in which no pit or groove was formed, was examined. As a result, it was found in the near field magneto-optical recording medium of Example 12 that the reflectance had a positive inclination in a range of flying height of from 40 to 150 nm because the signal intensity obtained in such range exhibited a positive inclination. Further, it was found in the near field magneto-optical recording medium of Comparative Example 3 that the reflectance had a negative inclination in a range of flying height of from 40 to 150 nm because the signal intensity obtained in such range exhibited a negative inclination.

Figure 17:
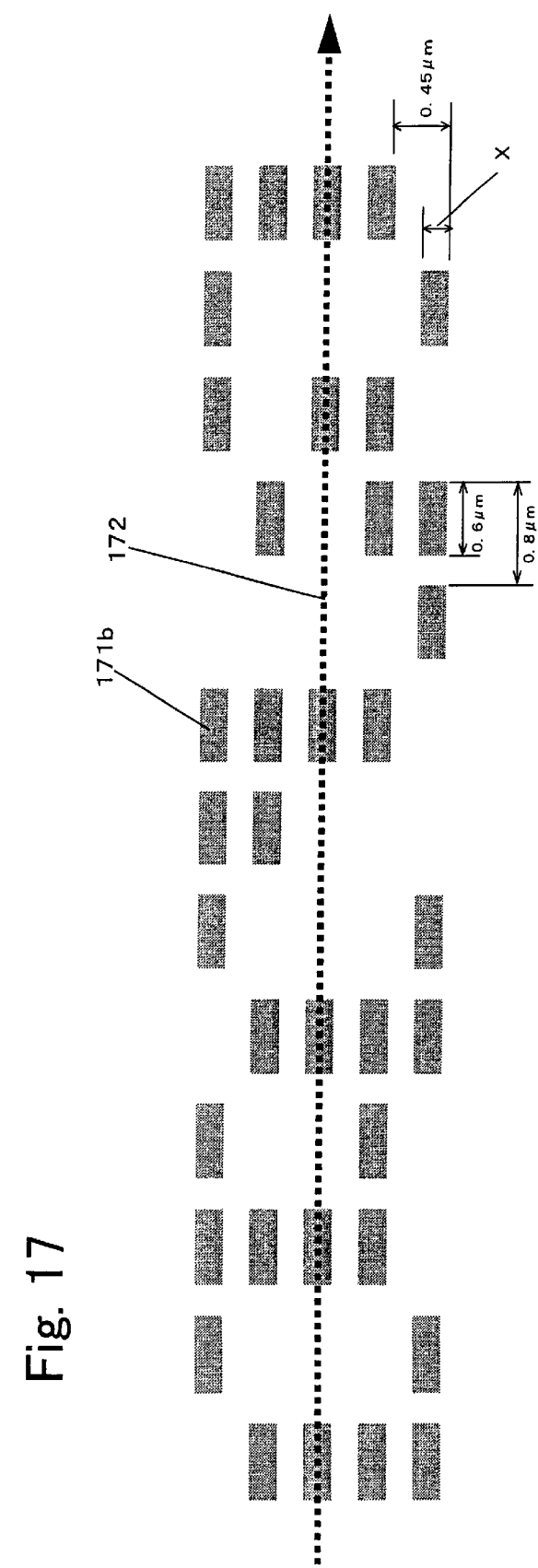
FIG. 17 shows a concave/convex pattern in the substrate of Embodiment 12 of the present invention wherein gray color portions (for instance, 171b) indicate convex portions. A direction of left and right corresponds to a direction of track, and a vertical direction corresponds to a direction perpendicular to tracks. The figure shows only 5 tracks.
Figure 18:
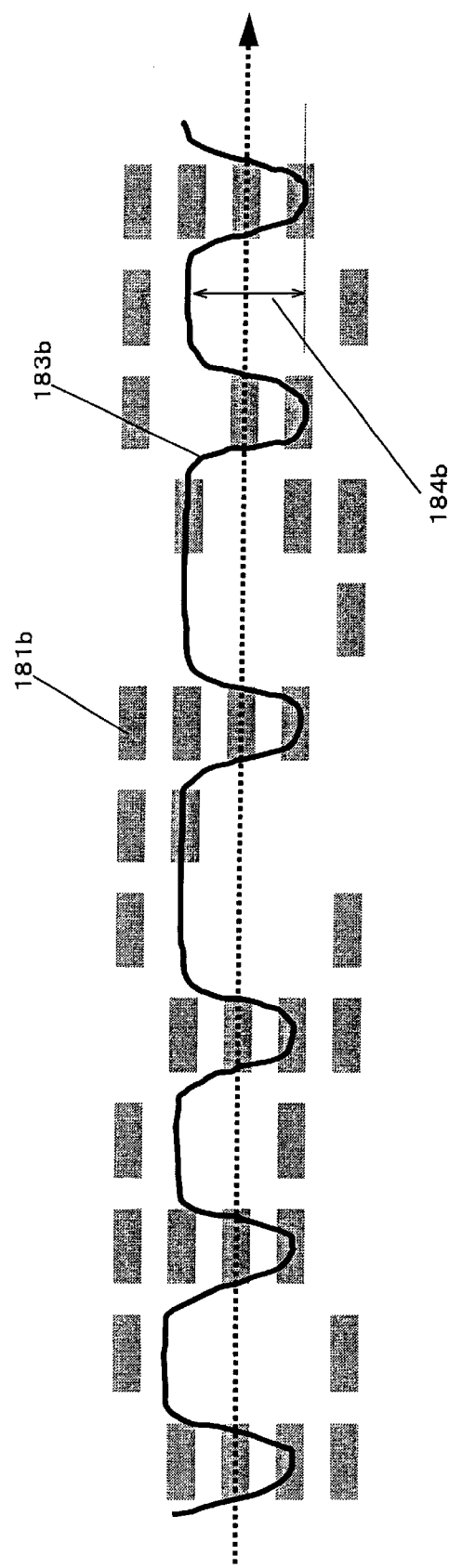
FIG. 18 is a diagram showing a reproducing signal to the pre-pit shown in FIG. 17. A curve line 183b indicates the reproducing single obtained by scanning the pre-pit in a direction of the arrow mark 172 in FIG. 17.

The waveform of a signal obtained by reproducing the pre-pit by scanning the near field magneto-optical recording medium (X=0.23 μm) of Example 12 with the head in a direction indicated by an arrow mark 172 in FIG. 17, is shown by 183b in FIG. 18. It is found that detection signals are reproduced largely for each bump. Further, the bump width (d/Tp) dependence of the signal amplitude 184b in FIG. 18 normalized by (Da+Dt) is shown in Table 7.

In an attempt to detect the pre-pit to the near field magneto-optical recording medium of Comparative Example 3 by the same manner as in Example 12, sufficient signals in detecting the pits could not be obtained.

TABLE 7

| d/Tp | \| Db-Dt \|/(Db + Dt) |
|---|---|
| 0.1 | 0.06 |
| 0.2 | 0.15 |
| 0.5 | 0.55 |
| 0.7 | 0.45 |

Example 13

Figure 19:
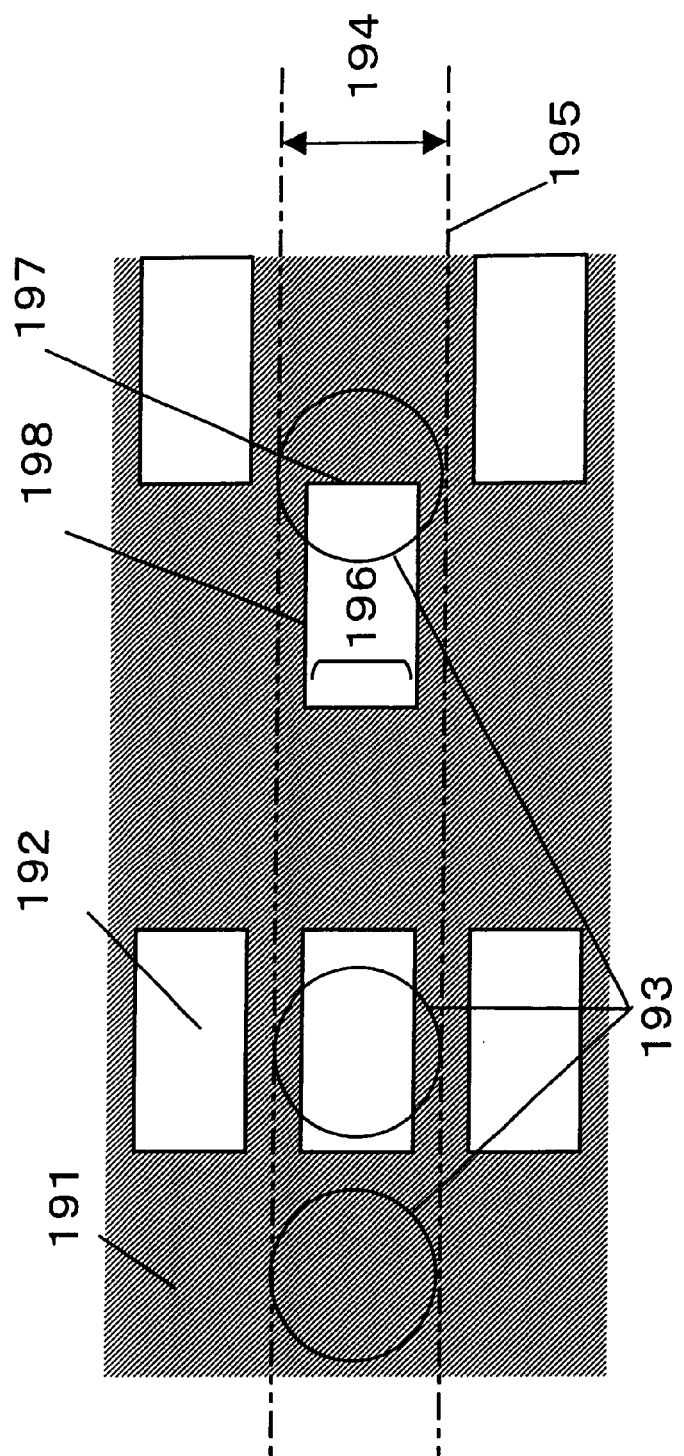
FIG. 19 is a diagram showing a pre-pit pattern in the substrate of Embodiment 13 of the present invention. A direction of left and right corresponds to a direction of track and a vertical direction corresponds a direction perpendicular to tracks. The figure shows 3 tracks wherein white color portions (for instance, 192) indicate convex portions and gray color portions (for instance, 191) indicate concave portions. Numeral 195 designates the boundary of tracks and numeral 194 designates a track width.

Substrates of polycarbonate having a concave/convex-shaped header portion as shown in FIG. 19 were prepared by injection-molding. The track pitch 194 is 500 nm. On each substrate, Au having a layer thickness of 50 nm, TbFeCoTa having a layer thickness of 20 nm, a SiN layer having a layer thickness of 210 nm and diamond-like carbon (DLC) layer having a layer thickness of 10 nm were formed respectively by sputtering. In this layer structure, the reflectance R has a positive inclination in a range of from 30 nm to 150 nm in terms of the distance between a bottom surface of SIL and the substrate surface, with respect to light having a wavelength of 685 nm. After the formation of the DLC layer, a perfluoropolyether type lubricant layer was coated in a thickness of 1 nm by a lifting method. Thus, near field magneto-optical recording media were prepared. In this case, the width of the bumps was X nm and the height of the bumps was Y nm. Various near field optical recording media in which values of X and Y were changed, were prepared.

Example 14

Figure 20:
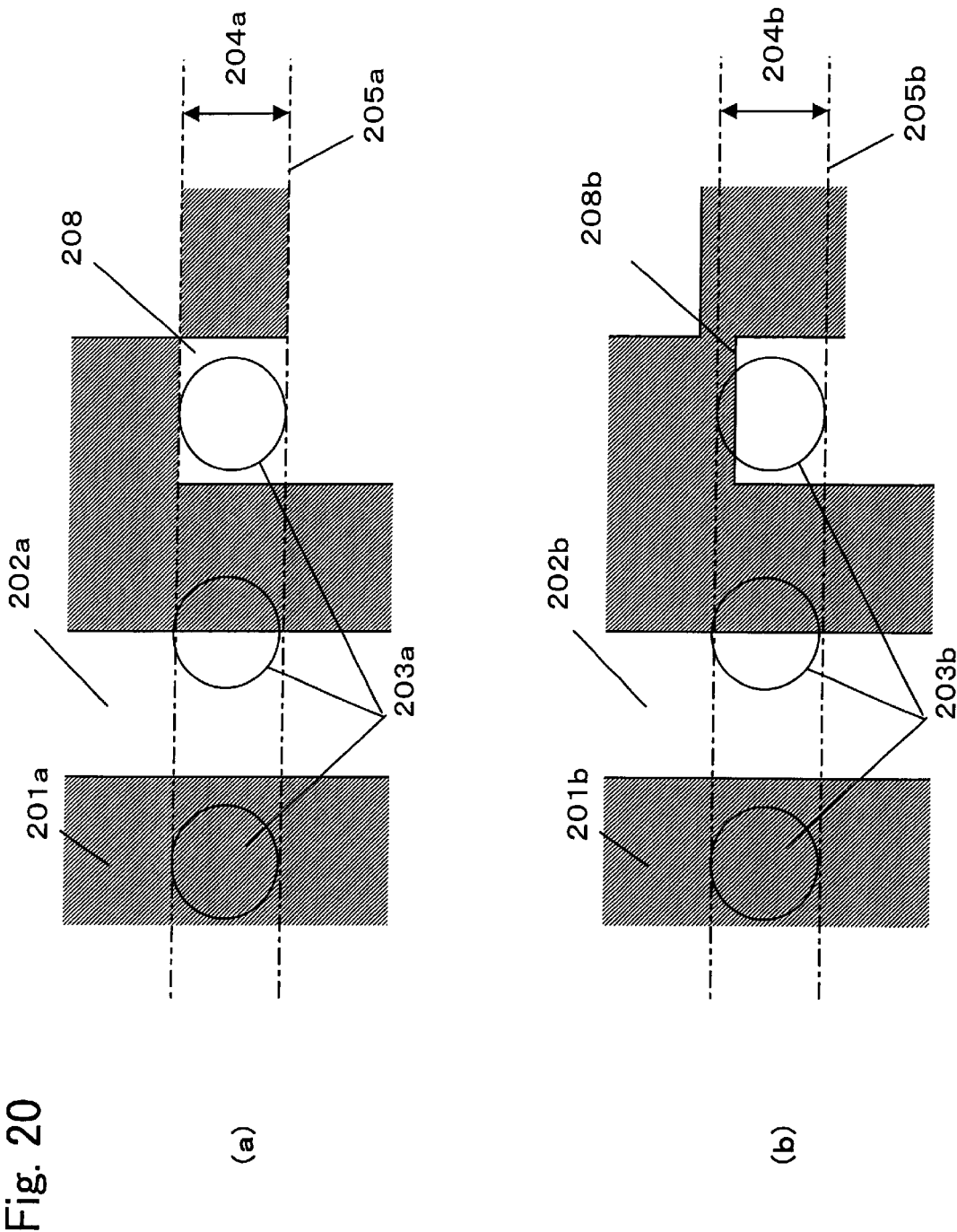
FIG. 20(a) is a diagram showing a pre-pit pattern in the substrate of Embodiment 14 of the present invention. A direction of left and right corresponds to a direction of track, and a vertical direction corresponds to a direction perpendicular to tracks. The figure shows 3 tracks wherein white color potions (for instance, 202a) indicate convex portions, and gray color portions (for instance, 201(a) indicate concave portions. Numeral 205a designates the boundary of tracks and numeral 204a designates a track width. In this pattern, the width of bumps is made correspondent with the track width.
FIG. 20(b) is a diagram showing a pre-pit pattern in the substrate of Embodiment 14 of the present invention. A direction of left and right corresponds to a direction of track, and a vertical direction corresponds to a direction perpendicular to tracks. The figure shows 3 tracks wherein white color portions (for instance, 202b) indicate convex portions and gray color portions (for instance, 201b) indicate concave portions. Numeral 205b designates the boundary of tracks and numeral 204b designates a track width. In this pattern, when concave portions or convex portions are not adjacent to each other at an equivalent position in adjacent tracks, boundaries of steps in parallel to a track (for instance, 208b) are shifted to a side of convex portion with respect to the boundary of tracks.

A near field optical recording medium was prepared in the same manner as in Example 15. In this Example, however, the near field optical recording medium was prepared by making the width of the bumps coincident with the width of the tracks as shown in FIG. 20(a). The difference of height of concave and convex was 50 nm.

Example 15

A near field optical recording medium was prepared by the same method as in Example 14. In this Example, however, the near field optical recording medium was prepared so that the boundary of a step in parallel to the track (for instance, 208b) was shifted to a side of convex portion with respect to the boundary of the track, in a portion that concave portions or convex portions are not adjacent to each other in adjacent tracks at an equivalent position.

Comparative Example 4

A near field optical recording medium was prepared by the same method as in Example 14. In this Comparative Example, however, the layer thickness of the SiN layer was 260 nm. In this layer structure, the reflectance R shows a negative inclination in a range of from 30 nm to 150 nm in terms of the distance between a bottom surface of SIL and the medium surface with respect to light having a wavelength of 685 nm.

Comparative Example 5

A near field optical recording medium was prepared by the same method as in Example 15. In this Comparative Example, however, the layer thickness of the SiN layer was 260 nm. In this layer structure, the reflectance R shows a negative inclination in a range of from 30 nm to 150 nm in terms of the distance between a bottom surface of SIL and the medium surface, with respect to light having a wavelength of 685 nm.

Each of the near field optical recording media of Examples 13 to 15 and Comparative Examples 4 and 5 was rotated at a linear velocity of 10 m/s to float the SIL head to a height of 80 nm. Power for reproducing was 1.3 mW. The difference of intensity of light at a front half portion and a rear half portion of the head was detected with a half-split detector. A change in output voltage at this time was also measured. Further, error rates of the header were measured. The wavelength of laser light irradiated through the SIL head at this time is 685 nm and the effective numerical aperture of the SIL head is 1.3. Result of the measurement is shown in Table 8.

TABLE 8

| | Bump height [nm] | Bump width [λ/NA] | \|Dc − Dd\|/ (Dc + Dd) | 信号 [mV] | Error rate |
|---|---|---|---|---|---|
| Example 13 | 50 | 0.2 | 0.04 | 8 | Unmeasurable |
| | 50 | 0.25 | 0.06 | 20 | $3.3 \times 10^{-4}$ |

TABLE 8-continued

|  | Bump height [nm] | Bump width [λ/NA] | \|Dc − Dd\|/ (Dc + Dd) | 信号 [mV] | Error rate |
|---|---|---|---|---|---|
|  | 50 | 0.3 | 0.30 | 45 | $2.2 \times 10^{-4}$ |
|  | 50 | 0.5 | 0.58 | 90 | $1.2 \times 10^{-4}$ |
|  | 50 | 0.7 | 0.77 | 115 | $8.0 \times 10^{-5}$ |
|  | 50 | 0.9 | 0.85 | 128 | $5.8 \times 10^{-5}$ |
| Example 14 | 50 | — | 0.93 | 140 | $3.5 \times 10^{-5}$ |
| Example 15 | 50 | — | 0.94 | 142 | $2.3 \times 10^{-5}$ |
| Comparative Example 4 | 50 | — | 0.12 | 18 | $4.2 \times 10^{-4}$ |
| Comparative Example 5 | 50 | — | 0.14 | 21 | $3.3 \times 10^{-4}$ |

Pit width is normalized by λ/NA.

It is found from Table 8 that the header signal is large and the error rate is low in the near field optical recording medium in which the reflectance R has a positive inclination in comparison with the near field optical recording medium in which the reflectance R has a negative inclination. Further, it is found that the error rate can further be reduced by shifting the boundary of a step in parallel to the track to a side of convex portion with respect to the boundary of the track, in a portion that concave portions or convex portions are not adjacent to each other in adjacent tracks at an equivalent position, or making the width of the pits coincident with the width of the track.

Example 16

A substrate of polycarbonate having a diameter of 130 mm and having a concave/convex-shaped header portion in which the width of pits was coincident with the width of tracks as shown in FIG. 20(a), was prepared by injection-molding. The track pitch is 500 nm. On the substrate, Au having a layer thickness of 50 nm, TbFeCoTa having a layer thickness of 20 nm, a SiN layer having a layer thickness of 210 nm and diamond-like carbon (DLC) layer having a layer thickness of 10 nm were formed respectively by sputtering. After the formation of the DLC layer, a perfluoropolyether type lubricant layer was coated in a thickness of 1 nm by a lifting method. Thus, a near field optical recording medium was prepared. In this case, the difference of height of pits was 50 nm. In this case, the radius of the portion forming the header was in a range of from 30 to 55 mm.

The near field optical recording medium of Example 16 was set on a glide tester. Seeking was conducted on the disc with use of a glide head with a piezo element (manufactured by Glide Height Co., flying height: 50 nm, head width: 3 mm). Voltage values induced in the piezo element were monitored to measure the flying properties of the head. As a result, it was found that excellent flying properties were exhibited in a range of head-flying region of from 28.5 to 56.5 mm (the central position of the head), and on the other hand, the flying properties of the head were deteriorated in regions of an inner side from 28.5 mm and an outer side from 56.5 mm.

Example 17

A substrate of polycarbonate having a diameter of 130 mm and having a header portion which comprised a concave/convex-shaped portion in which the width of pits was in coincident with the width of tracks as shown in FIG. 20(a) and a flat portion as a soft format area, was prepared by injection-molding. The track pitch is 500 nm. On the substrate, Au having a layer thickness of 50 nm, TbFeCoTa having a layer thickness of 20 nm, a SiN layer having a layer thickness of 210 nm and diamond-like carbon (DLC) having a layer thickness of 10 nm were formed respectively by sputtering. After the formation of the DLC layer, a perfluoropolyether type lubricant layer was coated in a thickness of 1 nm by a lifting method. Thus, a near field optical recording medium was prepared. In this case, the difference of height of pits was 50 nm, and grooves having a width of 150 nm and a depth of 30 nm were formed at a pitch of 500 nm in a flat portion of a soft format area. The depth of grooves between tracks in a data area is 50 nm.

Comparative Example 6

A near field optical recording medium was prepared by the same method as in Example 17. In this Comparative Example, however, grooves in a soft format area were not formed.

Each of the near field optical recording media of Example 17 and Comparative Example 6 was set on a glide tester. Seeking was conducted on the disk with use of a glide head with a piezo element (manufactured by Glide Height Co., flying height: 50 nm, head width: 3 mm). voltage values induced in the piezo element were monitored to measure the flying properties of the head. As a result, Example 17 exhibited very excellent flying properties of the head in comparison with Comparative Example 6.

What is claimed is:

1. In a near field optical recording medium having a header area in which at least an addressing signal for reproducing an address or a timing signal for providing datum for writing an address is recorded by means of a concave/convex pattern formed in a substrate wherein recording and/or reproducing is conducted by laser light using a flying optical head, the near field optical recording medium being characterized in that said concave/convex pattern is constituted by concave pits or convex bumps, each width of the pits or the bumps in a direction perpendicular to a track being smaller than the beam spot, wherein |Dp−Df|/(Dp+Df)≧0.05 where Dp is an intensity of returning light returned to the optical head at a position just above a pit or just above a bump and Df is an intensity of returning light returned to the optical head in a flat portion in which no pit or bump is formed, or said concave/convex pattern is constituted by concave portions and convex portions adjacent to each other wherein in a case that returning light returned to the optical head at a position just above a step portion, which is formed at the boundary of a concave portion and a convex portion which are adjacent to each other in a direction of track, is divided into a concave side and a convex side, |Dc−Dd|/(Dc+Dd)≧0.05 where Dc is an intensity of returning light at a concave side and Dd is an intensity of returning light at a convex side.

2. The near field optical recording medium according to claim 1, wherein a signal reproduced by an effect due to a change in an intensity of reflection light, which depends on the distance between a bottom surface of the optical head and the medium surface, is larger than a signal reproduced by diffraction caused by a step in a side surface, in parallel to the track, of a pit or a bump, and wherein 0.7×λ/NA≦L where L is a length of pit or bump in a direction perpendicular to the track, λ is a laser wavelength and NA is an effective numerical aperture.

3. The near field optical recording medium according to claim 1, wherein a signal reproduced by diffraction caused by a step in a side surface, in parallel to a track, of a pit or a bump is larger than a signal reproduced by an effect due to a change in an intensity of reflection light, which depends on the distance between a bottom surface of the optical head and the medium surface, and wherein $0.3 \times \lambda/NA \leq L \leq 0.5 \times \lambda/NA$ where L is a length of pit or bump in a direction perpendicular to the track, $\lambda$ is a laser wavelength and NA is an effective numerical aperture.

4. In a near field optical recording medium wherein a pre-pit is formed in at least a surface of a substrate; at least a recording layer and a protective layer are formed on the substrate in this order, and information-recording/reproducing is conducted substantially concentrically or spirally by laser light using a flying optical head, the near field optical recording medium being characterized in that in a state of propagating near field light on the medium, returning light from the recording medium to the optical head at a position just above a step portion of a pre-pit portion is composed of reflection light from a bottom surface of a pit and a plane adjacent to the pit and diffraction light at the step portion, wherein in a case that the returning light is divided into a front half portion and a rear half portion in a direction of moving the optical head, $|Dc-Dd|/(Dc+Dd) \geq 0.05$ where Dc is an intensity of returning light in the front half portion and Dd is an intensity of returning light in the rear half portion.

5. The near field optical recording medium according to claim 4, wherein when Ha is the distance between a bottom surface of the optical head and a bottom surface of a pit, and Ht is the distance between the bottom surface of the optical head and a plane adjacent to the pit, the reflectance R has a positive inclination in a range of from Ht to Ha.

6. In a near field optical recording medium having a header area in which at least an addressing signal for reproducing an address or a timing signal for providing datum for writing an address is recorded by means of a concave/convex pattern formed in a substrate wherein recording and/or reproducing is conducted by laser light using a flying optical head, the near field optical recording medium being characterized in that a change in returning light returned from the concave/convex portion formed in the header area includes at least a change due to a distance effect wherein the reflectance is changed depending on the distance between a bottom surface of the optical head and the substrate surface and a change due to a diffraction effect caused by a step, and wherein the header area is so constructed that in detecting the concave/convex portion, the effect due to the change by the distance effect and the effect by the diffraction effect are not mutually weakened by each other.

7. The near field optical recording medium according to claim 6, wherein there is such construction that in detecting the concave/convex portion, the effect due to the change by the distance effect and the effect due to the diffraction effect are mutually strengthened.

8. The near field optical recording medium according to claim 6, wherein said concave/convex pattern is constituted by concave pits, each width of the pits in a direction perpendicular to a track being smaller than the beam spot, wherein when Ht is the distance between a bottom surface of the optical head and a flat portion in which no pit is formed, and Ha is the distance between the bottom surface of the optical head and a bottom surface of a pit, the reflectance R has a negative inclination in a range of from Ht to Ha.

9. The near field optical recording medium according to claim 8, wherein the height of a step formed by the pit is from 30 to 100 nm.

10. The near field optical recording medium according to claim 6, wherein a pre-pit comprising concave pits is formed in at least a surface of a substrate; at least a recording layer and a protective layer are formed on the substrate in this order, and information-recording/reproducing is conducted substantially concentrically or spirally by laser light using a flying optical head, and, wherein when Ht is the distance between a bottom surface of the optical head and a flat portion in which no pit is formed, and Ha is the distance between the bottom surface of the optical head and a bottom surface of the pit, the reflectance R has a negative inclination in a range of from Ht to Ha.

11. The near field optical recording medium according to claim 10, wherein when Da is an intensity of returning light to the optical head at a position just above the pit, and Dt is an intensity of returning light to the optical head in a flat portion in which no pit is formed, $|Da-Dt|/(Da+Dt) \geq 0.05$.

12. The near field optical recording medium according to claim 6, wherein said concave/convex pattern is constituted by convex bumps, each width of the bumps in a direction perpendicular to a track being smaller than the beam spot, wherein when Ht is the distance between a bottom surface of the optical head and a flat portion in which no bump is formed, and Hb is the distance between the bottom surface of the optical head and an upper surface of a bump, the reflectance R has a positive inclination in a range of from Hb to Ht.

13. The near field optical recording medium according to claim 12, wherein the height of a step formed by the bump is from 30 to 100 nm.

14. The near field optical recording medium according to claim 6, wherein a pre-pit comprising convex bumps is formed in at least a surface of a substrate; at least a recording layer and a protective layer are formed on the substrate in this order, and information-recording/reproducing is conducted substantially concentrically or spirally by laser light using a flying optical head, and wherein when Ht is the distance between a bottom surface of the optical head and a flat portion in which no bump is formed, and Hb is the distance between the bottom surface of the optical head and an upper surface of a bump, the reflectance R has a positive inclination in a range of from Hb to Ht.

15. The near field optical recording medium according to claim 14, wherein when Db is an intensity of returning light to the optical head at a position just above a bump, and Dt is an intensity of returning light to the optical head in a flat portion in which no bump is formed, $|Dt-Db|/(Dt+Db) \geq 0.05$.

16. The near field optical recording medium according to claim 6, wherein said concave/convex pattern is constituted by concave portions and convex portions which are adjacent to each other, wherein when Hc is the distance between a bottom surface of the optical head and a bottom surface of a concave portion, and Hd is the distance between the bottom surface of the optical head and an upper surface of a convex portion, the reflectance R has a positive inclination in a range of from Hd to Hc.

17. The near field optical recording medium according to claim 16, wherein when concave portions or convex portions in the concave/convex pattern formed in the header area are at an equivalent position in adjacent tracks, the concave portions or the convex portions are connected in a direction perpendicular to the tracks by bridging the adjacent tracks.

18. The near field optical recording medium according to claim 17 wherein when concave portions or convex portions are not adjacent to each other in adjacent tracks at an equivalent position, a step formed at the boundary of a concave portion and a convex portion, which are adjacent to each other in adjacent tracks, is shifted to a side of the track in which the convex portion is formed, with respect to the boundary of the adjacent tracks.

19. The near field optical recording medium according to claim 18, wherein a land and a groove are provided, and information-recording and/or reproducing is conducted by using either the land or the groove.

20. The near field optical recording medium according to claim 18, wherein a land and a groove are provided; information-recording and/or reproducing is conducted by using both the land and the groove, and a land track and a groove track, which are adjacent to each other, have different kinds of header information.

21. The near field optical recording medium according to claim 18, wherein a land and a groove are provided; information-recording and/or reproducing is conducted by using both the land and the groove, and a land track and a groove track, which are paired and are adjacent to each other, have a common header information.

22. The near field optical recording medium according to claim 18, wherein the height of the step formed at the boundary of the adjacent concave portion and convex portion is from 30 to 100 nm.

23. The near field optical recording medium according to claim 6, wherein when Hc is the distance between a bottom surface of the optical head and a bottom surface of a concave portion forming the concave/convex pattern, and Hd is the distance between the bottom surface of the optical head and an upper surface of a convex portion forming the concave/convex pattern, a layer having the properties that the reflectance R has a positive inclination in a range of from Hd to Hc is used, and wherein when there are concave portions at an equivalent position in a circumferential direction in adjacent tracks among concave portions and convex portions which constitute the header area, these concave portions are connected in a direction perpendicular to the tracks, and when there are convex portions at an equivalent position in a circumferential direction in adjacent tracks, these convex portions are separated in a direction perpendicular to the tracks and the width of each convex portion in a direction perpendicular to the track is at least smaller than the width of the track.

24. The near field optical recording medium according to claim 6, wherein when Hc is the distance between a bottom surface of the optical head and a bottom surface of a concave portion forming the concave/convex pattern, and Hd is the distance between the bottom surface of the optical head and an upper surface of a convex portion forming the concave/convex pattern, a layer having the properties that the reflectance R has a positive inclination in a range of from Hd to Hc is used, and wherein when there are concave portions or convex portions at an equivalent position in a circumferential direction in adjacent tracks among concave portions and convex portions which constitute the header area, the concave portions or the convex portions are connected in a direction perpendicular to the tracks, and when there are a concave portion and a convex portion at an equivalent position in a circumferential direction in adjacent tracks, the boundary of a concave portion and the convex portion which are adjacent to each other in the adjacent tracks is shifted to a side of the convex portion with respect to the boundary of the tracks.

25. The near field optical recording medium according to claim 6, wherein when Hc is the distance between a bottom surface of the optical head and a bottom surface of a concave portion forming the concave/convex pattern, and Hd is the distance between the bottom surface of the optical head and an upper surface of a convex portion forming the concave/convex pattern, a layer having the properties that the reflectance R has a negative inclination in a range of from Hd to Hc is used, and wherein when there are convex portions at an equivalent position in a circumferential direction in adjacent tracks among concave portions and convex portions which constitute the header area, these convex portions are connected in a direction perpendicular to the tracks, and when there are concave portions at an equivalent position in a circumferential direction in adjacent tracks, these concave portions are separated in a direction perpendicular to the tracks and the width of each concave portion in a direction perpendicular to the track is at least smaller than the width of the track.

* * * * *